United States Patent
Song et al.

(10) Patent No.: US 12,301,504 B2
(45) Date of Patent: May 13, 2025

(54) METHOD AND APPARATUS FOR DETERMINING TRANSMISSION PARAMETER

(71) Applicant: FUJITSU LIMITED, Kawasaki (JP)

(72) Inventors: Lei Song, Beijing (CN); Zhe Chen, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 332 days.

(21) Appl. No.: 17/731,346

(22) Filed: Apr. 28, 2022

(65) Prior Publication Data

US 2022/0255703 A1 Aug. 11, 2022

Related U.S. Application Data

(63) Continuation of application No. PCT/CN2019/116366, filed on Nov. 7, 2019.

(51) Int. Cl.
*H04L 5/00* (2006.01)
*H04W 72/23* (2023.01)

(52) U.S. Cl.
CPC ........... *H04L 5/0053* (2013.01); *H04W 72/23* (2023.01)

(58) Field of Classification Search
CPC ... H04L 5/0035; H04L 5/0048; H04L 5/0053; H04W 72/23; H04W 72/04
See application file for complete search history.

(56) References Cited

U.S. PATENT DOCUMENTS

| | | | | |
|---|---|---|---|---|
| 2019/0140729 A1* | 5/2019 | Zhang | .................. | H04W 52/16 |
| 2019/0253220 A1 | 8/2019 | Kim | | |
| 2020/0015200 A1* | 1/2020 | Vilaipornsawai | ..... | H04W 72/23 |
| 2020/0053757 A1* | 2/2020 | Bagheri | ................ | H04W 24/08 |

(Continued)

FOREIGN PATENT DOCUMENTS

| | | |
|---|---|---|
| CN | 108199819 A | 6/2018 |
| CN | 109983797 A | 7/2019 |

(Continued)

OTHER PUBLICATIONS

Notice of Reasons for Refusal issued by the Japan Patent Office for corresponding Japanese Patent Application No. 2022-525175, mailed on May 9, 2023, with an English translation.

(Continued)

*Primary Examiner* — Chi Ho A Lee
(74) *Attorney, Agent, or Firm* — Myers Wolin, LLC

(57) ABSTRACT

A method and apparatus for determining transmission parameters. The apparatus includes: to receive at least two TCI state related parameters or signaling configured or indicated by a network device; and to determine a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or determine a transmission parameter of at least one transmission occasion of a transport block according to a related parameter or signaling containing a TCI state mapping pattern, and DCI signaling not containing a TCI field, in the at least two TCI state related parameters or signaling.

11 Claims, 9 Drawing Sheets

(56) References Cited

U.S. PATENT DOCUMENTS

| | | | |
|---|---|---|---|
| 2020/0351129 A1* | 11/2020 | Kwak | H04W 76/27 |
| 2020/0351841 A1* | 11/2020 | Cirik | H04W 48/08 |
| 2020/0351892 A1* | 11/2020 | Yi | H04L 5/0092 |
| 2021/0051667 A1 | 2/2021 | Yang et al. | |
| 2021/0084623 A1 | 3/2021 | Zhang et al. | |
| 2022/0123818 A1 | 4/2022 | Li | |
| 2022/0322410 A1* | 10/2022 | Matsumura | H04W 72/1273 |
| 2022/0337300 A1* | 10/2022 | Yuk | H04W 72/54 |
| 2022/0360408 A1* | 11/2022 | Jung | H04B 7/0628 |
| 2022/0386332 A1* | 12/2022 | Yokomakura | H04W 72/23 |
| 2022/0400489 A1* | 12/2022 | Kim | H04W 72/23 |

FOREIGN PATENT DOCUMENTS

| | | |
|---|---|---|
| CN | 110034853 A | 7/2019 |
| CN | 110167091 A | 8/2019 |

OTHER PUBLICATIONS

ZTE, "Considerations on beam management for multi-TRP", Agenda item: 7.2.8.5, 3GPP TSG RAN WG1 #97, R1-1906244, Reno, USA, May 13-17, 2019.

Vivo, "Remaining issues on multi-TRP/Panel transmission", Agenda item: 7.2.8.2, 3GPP TSG RAN WG1 #98, R1-1908166, Prague, CZ, Aug. 26-30, 2019.

International Search Report and Written Opinion of the International Searching Authority issued by the China National Intellectual Property Administration for corresponding International Patent Application No. PCT/CN2019/116366, mailed on Jul. 29, 2020, with an English translation.

CATT, "Considerations on multi-TRP/panel transmission", Agenda Item 7.2.8.2, 3GPP TSG RAN WG1 Meeting #98bis, R1-1910349, Chongqing, China, Oct. 14-20, 2019.

Nokia et al., "Feature lead summary on QCL", Agenda Item 7.1.2.3.7, 3GPP TSG RAN WG1 Meeting #93, R1-1807664, Busan, Korea, May 21-25, 2018.

Extended European search report with the Supplementary European search report and the European search opinion issued by the European Patent Office for corresponding European Patent Application No. 19951764.0-1215, mailed on Oct. 5, 2022.

First Notification of Office Action and Search Report issued by the China National Intellectual Property Administration for corresponding Chinese Patent Application No. 201980101894.4, mailed on Dec. 24, 2024, with an English translation.

* cited by examiner

901 at least two TCI state related parameters or signaling are configured or indicated to a terminal equipment, so that the terminal equipment determines a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or so that the terminal equipment determines a transmission parameter of at least one transmission occasion of a transport block according to a related parameter or signaling containing a TCI state mapping pattern, and DCI signaling not containing a TCI field, in the at least two TCI state related parameters or signaling, or so that the terminal equipment determines a transmission parameter of at least one transmission occasion of a transport block according to a TCI state pattern determined by the terminal equipment and a parameter or signaling indicating that DCI signaling contains a TCI field in the at least two TCI state related parameters or signaling

FIG. 9

METHOD AND APPARATUS FOR DETERMINING TRANSMISSION PARAMETER

CROSS-REFERENCE TO RELATED APPLICATION

This application is a continuation application of International Application PCT/CN2019/116366 filed on Nov. 7, 2019 and designated the U.S., the entire contents of which are incorporated herein by reference.

TECHNICAL FIELD

This disclosure relates to the field of communication technologies.

BACKGROUND

In a New Radio (NR) system, it is necessary to support some low-latency and high-reliability service scenarios, such as Augmented Reality (AR)/Virtual Reality (VR), factory automation, transportation scenarios including remote driving, and distributed power system control. These services have a latency requirement of 0.5 ms-1 ms and a reliability requirement of 1e-6. Therefore, a fifth-generation (5G) system needs to study transmission technologies with high reliability and low latency to meet these service scenarios.

In order to improve reliability of transmission, Rel-15 has supported repeated transmission of data channels, that is, multiple redundant versions of the same transport block (TB) are repeatedly transmitted in multiple consecutive slots.

In order to further improve reliability of transmission and further reduce transmission delay, Rel-16 enhances repeated transmission of data channels. For example, multiple versions of repeated transmissions (also referred to as repeated versions) may be transmitted in one slot, that is, the repeated transmission at a mini-slot level is realized; for another example, multiple transmission points (TRPs) are used to transmit identical data for a terminal equipment, thereby increasing reliability of transmission. Multiple repeated versions of multiple TRP transmissions may be space division multiplexing (SDM), frequency division multiplexing (FDM), or time division multiplexing (TDM); and furthermore, time-division multiplexing may include time-division multiplexing at a slot level, or time-division multiplexing at the non-slot (such as non-slot, mini-slot, and sub-slot) level. In addition, it may also be a combination of the above multiplexing modes, such as a combination of SDM and FDM, a combination of SDM and TDM, a combination of TDM and FDM, and a combination of SDM, TDM and FDM.

In performing transmission by using the multi-TRP technique, multiple TRPs may also transmit the same repeated version by using a beamforming technique. Each TRP pre-codes (weights) data channels by using different beamforming weights, and even if quality of a transmission link between one of the TRPs and the terminal equipment is poor which causes failure of signal reception, as long as one of repeated versions is transmitted correctly, thereby greatly increasing reliability of transmission. In the beamforming technique, the beamforming weights are configured or indicated to the terminal equipment in the form of a transmission configuration indication (TCI), and the terminal equipment may select an appropriate receive filter to receive signals, so as to maximize signal transmission quality.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In Rel-15, in a process of repeated transmission of identical or different versions of the same transport block, downlink control information (DCI) indicates only a transmission parameter of a first transmission occasion (i.e. a transmission time of a first repeated version), and transmission parameters of other transmission occasions are identical to that of the first transmission occasion. The transmission parameter includes, such as, time-domain resource allocation, frequency-domain resource allocation, a DMRS antenna port, and a TCI state.

TCI state mapping pattern parameters are newly introduced into Rel-16, which are used to configure patterns of TCI states when multiple repeated versions are transmitted at multiple transmission occasions. The TCI state mapping pattern parameters configure a TCI mapping pattern containing at most 2 TCI states, and then dynamically indicate two TCI states via DCI signaling.

Therefore, the terminal equipment may obtain TCI states of the transmission occasions according to the TCI state mapping pattern configured by the RRC signaling and a specific TCI state indicated by a TCI field in the DCI signaling.

However, it was found by the inventors that in some cases, the DCI signaling does not include a TCI state indication field, and how the terminal equipment determines a TCI state at this moment is not clearly specified. Therefore, the TCI states of the transmission occasions determined by the terminal equipment may be inconsistent with a TCI state used by the network device in performing downlink transmission, thereby leading to transmission failure.

In order to solve at least one of the above problems, embodiments of this disclosure provide a method and apparatus for determining a transmission parameter.

According to a first aspect of the embodiments of this disclosure, there is provided an apparatus for determining transmission parameters, applicable to a terminal equipment side, the apparatus including: a first receiving unit configured to receive at least two TCI state related parameters or signaling configured or indicated by a network device; and a first determining unit configured to determine a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or determine a transmission parameter of at least one transmission occasion of a transport block according to a related parameter or signaling containing a TCI state mapping pattern, and DCI signaling not containing a TCI field, in the at least two TCI state related parameters or signaling, or determine a transmission parameter of at least one transmission occasion of a transport block according to a TCI state pattern determined by the terminal equipment and a parameter or signaling indicating that DCI signaling contains a TCI field in the at least two TCI state related parameters or signaling.

According to a second aspect of the embodiments of this disclosure, there is provided an apparatus for determining transmission parameters, applicable to a terminal equipment side, the apparatus including: a second receiving unit configured to receive at least two TCI state related parameters or signaling in a parameter or signaling indicating that DCI signaling contains a TCI field, a parameter or signaling indicating that the DCI signaling does not contain a TCI field, DCI signaling containing a TCI field and DCI signaling not containing a TCI field; and a fourth determining unit configured to determine that TCI states of one or more transmission occasions are all first TCI states, the first TCI states being first TCI states indicated in the DCI signaling, or, configured to determine that TCI states used by one or more transmission occasions are all TCI states predefined when the DCI signaling does not contain a TCI indication field; or, a fifth determining unit configured to determine that a TCI state pattern of one or more transmission occasions is one of the patterns as follows: first TCI state (TCI1), second TCI state (TCI2), first TCI state (TCI1), second TCI state (TCI2); or first TCI state (TCI1), first TCI state (TCI1), second TCI state (TCI2), second TCI state (TCI2).

According to a third aspect of the embodiments of this disclosure, there is provided an apparatus for determining transmission parameters, applicable to a terminal equipment side, the apparatus including: a third receiving unit configured to receive a URLLC scheme 3 related configuration parameter, and receive a parameter or signaling indicating that DCI signaling does not contain a TCI field or DCI signaling not containing a TCI field; and a sixth determining unit configured to determine a predefined TCI state when a scheduled PDSCH has only one transmission occasion and a TCI state used for the transmission occasion is that DCI signaling does not contain a TCI indication field; or, a seventh determining unit configured to determine a predefined TCI state when the scheduled PDSCH has two transmission occasions and TCI states used for the two transmission occasions are both that the DCI signaling does not contain a TCI indication field.

According to a fourth aspect of the embodiments of this disclosure, there is provided an apparatus for determining transmission parameters, applicable to a network device side, the apparatus including: a first transmitting unit configured to configure or indicate at least two TCI state related parameters or signaling to a terminal equipment, so that the terminal equipment determines a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or so that the terminal equipment determines a transmission parameter of at least one transmission occasion of a transport block according to a related parameter or signaling containing a TCI state mapping pattern, and DCI signaling not containing a TCI field, in the at least two TCI state related parameters or signaling, or so that the terminal equipment determines a transmission parameter of at least one transmission occasion of a transport block according to a TCI state pattern determined by the terminal equipment and a parameter or signaling indicating that DCI signaling contains a TCI field in the at least two TCI state related parameters or signaling.

According to a fifth aspect of the embodiments of this disclosure, there is provided a terminal equipment, including the apparatus as described in any one of the first to the third aspects of the embodiments of this disclosure.

According to a sixth aspect of the embodiments of this disclosure, there is provided a network device, including the apparatus as described in the fourth aspect of the embodiments of this disclosure.

According to a seventh aspect of the embodiments of this disclosure, there is provided a communication system, including the terminal equipment as described in the fifth aspect of the embodiments of this disclosure and/or the network device as described in the sixth aspect of the embodiments of this disclosure.

According to an eighth aspect of the embodiments of this disclosure, there is provided a method for determining transmission parameters, applicable to a terminal equipment side, the method including: receiving at least two TCI state related parameters or signaling configured or indicated by a network device; and determining a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or determining a transmission parameter of at least one transmission occasion of a transport block according to a related parameter or signaling containing a TCI state mapping pattern, and DCI signaling not containing a TCI field, in the at least two TCI state related parameters or signaling, or determining a transmission parameter of at least one transmission occasion of a transport block according to a TCI state pattern determined by the terminal equipment and a parameter or signaling indicating that DCI signaling contains a TCI field in the at least two TCI state related parameters or signaling.

According to a ninth aspect of the embodiments of this disclosure, there is provided a method for determining transmission parameters, applicable to a terminal equipment side, the method including: receiving, by the terminal equipment, at least two TCI state related parameters or signaling in a parameter or signaling indicating that DCI signaling contains a TCI field, a parameter or signaling indicating that the DCI signaling does not contain a TCI field, DCI signaling containing a TCI field and DCI signaling not containing a TCI field; and determining, by the terminal equipment, that TCI states of one or more transmission occasions are all first TCI states, the first TCI states being first TCI states indicated in the DCI signaling, or, determining that TCI states used by one or more transmission occasions are all TCI states predefined when the DCI signaling does not contain a TCI indication field; or, determining, by the terminal equipment, that a TCI state pattern of one or more transmission occasions is one of the patterns as follows: first TCI state (TCI1), second TCI state (TCI2), first TCI state (TCI1), second TCI state (TCI2); or first TCI state (TCI1), first TCI state (TCI1), second TCI state (TCI2), second TCI state (TCI2).

According to a ten aspect of the embodiments of this disclosure, there is provided a method for determining transmission parameters, applicable to a terminal equipment side, the method including: receiving, by the terminal equipment, a URLLC scheme 3 related configuration parameter, and receiving a parameter or signaling indicating that DCI signaling does not contain a TCI field or DCI signaling not containing a TCI field; and determining, by the terminal equipment, a predefined TCI state when a scheduled PDSCH has only one transmission occasion and a TCI state used for the transmission occasion is that DCI signaling does not contain a TCI indication field; or, determining, by the terminal equipment, a predefined TCI state when the scheduled PDSCH has two transmission occasions and TCI states used for the two transmission occasions are both that the DCI signaling does not contain a TCI indication field.

According to an eleventh aspect of the embodiments of this disclosure, there is provided a method for determining transmission parameters, applicable to a network device side, the method including: configuring or indicating at least two TCI state related parameters or signaling to a terminal equipment, so that the terminal equipment determines a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or so that the terminal equipment determines a transmission parameter of at least one transmission occasion of a transport block according to a related parameter or signaling containing a TCI state mapping pattern, and DCI signaling not containing a TCI field, in the at least two TCI state related parameters or signaling, or so that the terminal equipment determines a transmission parameter of at least one transmission occasion of a transport block according to a TCI state pattern determined by the terminal equipment and a parameter or signaling indicating that DCI signaling contains a TCI field in the at least two TCI state related parameters or signaling.

According to a twelfth aspect of the embodiments of this disclosure, there is provided a computer readable program, which, when executed in an apparatus for determining transmission parameters or a terminal equipment, will cause the apparatus for determining transmission parameters or the terminal equipment to carry out the method for determining transmission parameters as described in any one of the eighth to the tenth aspects of the embodiments of this disclosure.

According to a thirteenth aspect of the embodiments of this disclosure, there is provided a computer storage medium, including a computer readable program, which will cause an apparatus for determining transmission parameters or a terminal equipment to carry out the method for determining transmission parameters as described in any one of the eighth to the tenth aspects of the embodiments of this disclosure.

According to a fourteenth aspect of the embodiments of this disclosure, there is provided a computer readable program, which, when executed in an apparatus for determining transmission parameters or a network device, will cause the apparatus for determining transmission parameters or the network device to carry out the method for determining transmission parameters as described in the eleventh aspect of the embodiments of this disclosure.

According to a fifteenth aspect of the embodiments of this disclosure, there is provided a computer storage medium, including a computer readable program code, which will cause an apparatus for determining transmission parameters or a network device to carry out the method for determining transmission parameters as described in the eleventh aspect of the embodiments of this disclosure.

An advantage of the embodiments of this disclosure exists in that the terminal equipment determines a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, or, according to a related parameter or signaling containing a TCI state mapping pattern and DCI signaling not containing a TCI field, or, according to a TCI state pattern determined by the terminal equipment and a parameter or signaling indicating that DCI signaling contains a TCI field, which may make the TCI state determined by the terminal equipment consistent with a TCI state used by the network device in performing downlink transmission, thereby ensuring correctness of PDSCH transmission.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 9 is a schematic diagram of the method for determining transmission parameters of Embodiment 4 of this disclosure;

DETAILED DESCRIPTION

Figure 1:
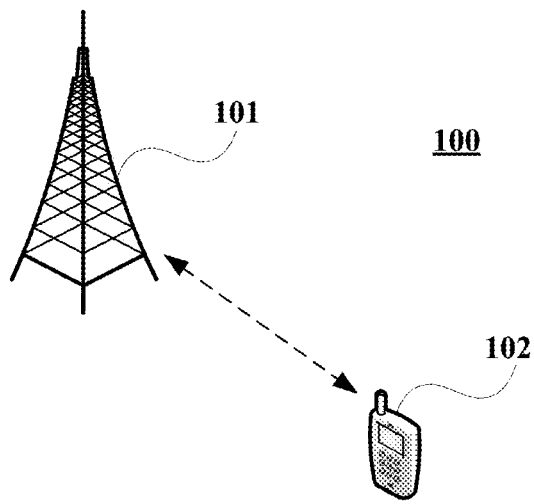
FIG. 1 is schematic diagram of a communication system of an embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Scenarios of the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and a terminal equipment 102. For the sake of simplicity, an example having only one terminal equipment is schematically given in FIG. 1. The network device 101 is, for example, a network device gNB of NR, which may include at least one transmission point (TRP).

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC).

In the embodiments of this disclosure, the communication system may be applicable to a multi-TRP scenario.

In the embodiments of this disclosure, when multi-TRP or multi-panel operation is used, a multi-TRP or multi-panel operation related mode may be explicitly configured via higher-layer signaling, or may be configured implicitly, or it may also be a scheme involving multiple TRP transmissions.

For example, the multi-TRP or multi-panel operation may be explicitly configured to be one or more transmission schemes, such as transmission scheme 2 or 3, an NC-JT (non-coherent joint transmission) scheme, and a combined scheme URLLC repeat transmissions (such as a combination of SDM, TDM, FDM, SDM and TDM, a combination of SDM and FDM, a combination of TDM and FDM, a combination of SDM, TDM and FDM, etc., of a transport block); it may also be implicitly indicated by configuring certain higher-layer parameters that the terminal equipment may perform the multi-TRP or multi-panel operation, such as implicitly indicating whether the terminal equipment performs multi-TRP or multi-panel operation by a configured number of demodulation reference signal port groups (DMRS port groups), number of ports of a phase tracking reference signal (PTRS), number of simultaneously transmitted PDCCHs, TCI state configuration related parameters, number of CORESET groups, and a higher-layer parameter configured in a CORESET (such as whether a parameter is related to an HARQ-ACK feedback codebook, with a value of 0 or 1).

For example, when the number of DMRS port groups (such as a maximum number) or the number of PTRS ports (such as a maximum number of ports) or the number of simultaneously transmitted PDCCHs (such as a maximum number) or the number of CORESET groups (such as a maximum number of groups) is greater than a threshold (such as 1), or when the number of TCI states configured by the TCI state configuration related parameters (such as a TCI state mapping pattern, and a maximum number of TCI states contained in a DCI signaling codepoint, etc.) is greater than a threshold (such as 1), or when higher-layer parameters are configured in the CORESET (parameter ControlResource-Set), such as higher-layer parameters HigherLayerIndexPer-CORESET or CORESETPoolIndex related to HARQ-ACK feedback or other parameter names, or higher-layer parameters configured in two or more CORESETs, such as higher-layer parameters different from those related to HARQ-ACK feedback or the number of parameters exceeds one, for example, the parameter HigherLayerIndexPerCORESET or CORESETPoolIndex of one or more CORESETs is set to be 0, and parameter HigherLayerIndexPerCORESET or CORESETPoolIndex of one or more CORESETs is set to be 1; or the parameter PDCCH-Config contains two parameters HigherLayerIndexPerCORESET or CORESETPoolIndex of different values; the terminal equipment determines that it is a multi-TRP or multi-panel operation; otherwise, the terminal equipment determines that it is a single-TRP or single-panel operation, or an operation other than a multi-TRP or multi-panel operation.

For another example, the multi-TRP or multi-panel operation may also be a scheme involving multiple TRP transmissions, such as coordinated multi-point (CoMP), carrier aggregation (CA), and dual connectivity (DC).

In the embodiments of this disclosure, the communication system may also be applicable to a URLLC scenario.

In order to improve reliability and coverage of a URLLC service, a transport block may be repeatedly transmitted multiple times, and the multiplexing modes between multiple repeated versions may include SDM, TDM, and FDM, etc., or a combination of these multiplexing modes, such as a combination of SDM and TDM, a combination of SDM and FDM, a combination of TDM and FDM, and a combination of SDM, TDM and FDM, etc. In addition, FDM may be subdivided into different schemes by using identical or different redundancy versions according to multiple transport blocks, such as schemes 2a and 2b. TDM may be divided into mini-slot-level repetition and slot-level repetition according to whether a transmission occasion of a repeated version is intra-slot repetition or inter-slot repetition, such as scheme 3 and scheme 4. Which URLLC scheme is used may be explicitly configured by using RRC signaling, for example, different states of one RRC parameter may be used to represent the above multiple URLLC schemes, or different RRC parameters may be used to represent different URLLC schemes. For example, the Rel-15 slot-level repeated transmission parameter pdsch-AggregationFactorc is followed to represent scheme 4, or one or more other RRC parameters are used to represent scheme 4. For example, when a parameter URLLCRepNum is configured or a value of this parameter is greater than 1, it means that the terminal equipment is configured to perform scheme 4-related transmission; for another example, a new RRC parameter (such as URLLCSchemeEnabler) is used to semi-statically indicate at least one of schemes 2a, 2b, and 3, etc.; for example, schemes 2a, 2b and 3 may respectively represent that values of URLLCSchemeEnabler are set to be 'FDMSchemeA', 'FDMSchemeB' or 'TDMSchemeA', etc.

In some cases, the DCI signaling does not include a TCI state indication field. For example, when the higher-layer signaling parameter TCI-PresentInDCI configured in a control resource set (CORESET) is in a disabled state, or a higher-layer parameter defined for a newly defined DCI format 1_2 in Rel-16 (such as being referred to as TCI-PresentInDCI-ForDCIFormat1_2, or other names) is in a disabled state, or when a DCI format is 1_0, the DCI signaling does not contain a TCI state indication field. Therefore, the terminal equipment is unable to obtain a TCI state of a physical downlink shared channel (PDSCH) via the DCI signaling. At this moment, the TCI state of the PDSCH is a predefined TCI state, the predefined TCI state being a TCI state of a CORESET used in physical downlink control channel (PDCCH) transmission for scheduling the PDSCH.

In Rel-16, when a multi-TRP mechanism is introduced, multiple repeated versions may possibly be transmitted by multiple TRPs, respectively, hence, multiple repeated versions transmitted by multiple TRPs (i.e. multiple transmission occasions) have different TCI states, and the TCI field in the DCI signaling may be used to indicate the TCI states when multiple TRPs transmit multiple repeated versions respectively. For example, RRC signaling is used to predefine TCI mapping patterns of multiple transmission occasions.

For example, when multiple TRPs transmit PDSCHs at 4 transmission occasions by using at most 2 TCI states, the TCI mapping pattern may be 1, 1, 2, 2, and TCI states representing the 4 transmission occasions are TCI 1, TCI 1, TCI 2, TCI 2, respectively; or the TCI mapping pattern may be 1, 2, 1, 2, and TCI states representing the 4 transmission occasions are TCI 1, TCI 2, TCI 1, TCI 2, respectively. Thereafter, two TCI states, TCI 1 and TCI 2, are indicated by using the DCI signaling including the TCI field.

In a case where the DCI signaling does not include the TCI state indication field, how the terminal equipment determines a TCI state is not clearly specified. Therefore, it may be resulted in that TCI states of transmission occasions determined by the terminal equipment are inconsistent with TCI states used by the network device in performing downlink transmission, thereby leading to transmission failure.

For example, there exists a situation where the DCI signaling does not include the TCI state indication field. For example, when a higher-layer signaling parameter TCI-PresentInDCI or TCI-PresentInDCI-ForDCIFormat1_2 is not configured in the control resource set (CORESET), or TCI-PresentInDCI or TCI-PresentInDCI is configured-ForDCIFormat1_2 is in a disabled (not enabled) state, or when the DCI format is 1_0, the DCI signaling does not include the TCI state indication field, and according to the Rel-15 protocol, the terminal equipment will assume that TCI states of transmission occasions of the PDSCH timing are predefined TCI states. In this case, when the TCI state mapping pattern configured by the RRC signaling includes two TCI states, a situation may occur where the numbers of TCI states indicated according to the two indication modes are inconsistent. In this case, the terminal equipment may possibly be unable to correctly determine the TCI states of the transmission occasions, that is, the TCI state determined by the terminal equipment is inconsistent with the TCI state used by the network device in performing transmission, thereby leading to transmission failure.

In order to solve at least one of the above problems, various implementations of the embodiments of this disclosure shall be described below with reference to the accompanying drawings. These embodiments are only illustrative, and are not intended to limit this disclosure.

Embodiment 1

The embodiment of this disclosure provides a method for determining transmission parameters, applicable to a terminal equipment side.

In this embodiment, the method includes: receiving at least two TCI state-related parameter or signaling configured or indicated by a network device; and determining at least one transmission of a transport block according to the at least two TCI state-related parameter or signaling Timing transmission parameters.

Figure 2:
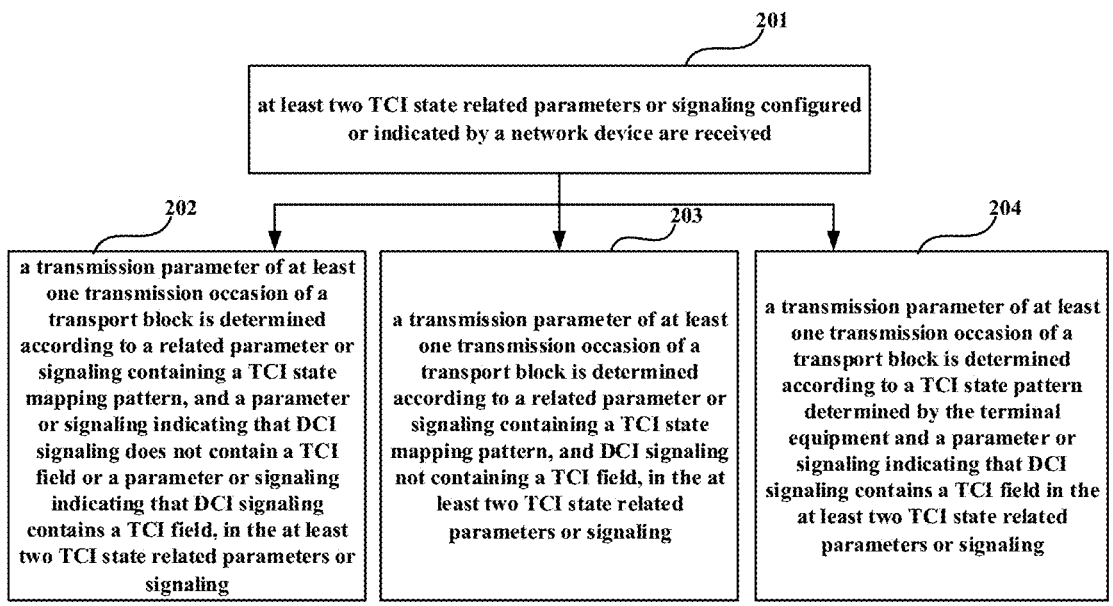
FIG. 2 is a schematic diagram of the method for determining transmission parameters of Embodiment 1 of this disclosure.

FIG. 2 is a schematic diagram of the method for determining transmission parameters of Embodiment 1 of this disclosure. As shown in FIG. 2, the method includes:

Step 201: at least two TCI state related parameters or signaling configured or indicated by a network device are received; and Step 202: a transmission parameter of at least one transmission occasion of a transport block is determined according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or Step 203: a transmission parameter of at least one transmission occasion of a transport block is determined according to a related parameter or signaling containing a TCI state mapping pattern, and DCI signaling not containing a TCI field, in the at least two TCI state related parameters or signaling, or Step 204: a transmission parameter of at least one transmission occasion of a transport block is determined according to a TCI state pattern determined by the terminal equipment and a parameter or signaling indicating that DCI signaling contains a TCI field in the at least two TCI state related parameters or signaling.

In this way, according to the related parameter or signaling containing the TCI state mapping pattern and the parameter or signaling indicating that the DCI signaling does not contain a TCI field, or the parameter or signaling indicating that the DCI signaling contains a TCI field, or, according to the related parameter or signaling containing the TCI state mapping pattern and the DCI signaling not containing a TCI field, or, according to the TCI state pattern determined by the terminal equipment and the parameter or signaling indicating that the DCI signaling contains a TCI field, the terminal equipment determines the transmission parameter of the at least one transmission occasion of the transport block. Therefore, the TCI state determined by the terminal equipment may be made consistent with a TCI state used by the network device in performing downlink transmission, thereby ensuring correctness of PDSCH transmission.

In this embodiment, the at least two TCI state related parameters or signaling received by the terminal equipment from the network device may include at least two of the following parameters or signaling: a parameter or signaling indicating that DCI signaling contains a TCI field; a parameter or signaling indicating that DCI signaling does not contain a TCI field; a related parameter or signaling containing a TCI state mapping pattern; DCI signaling containing a TCI field; or DCI signaling not containing a TCI field.

In this embodiment, for example, the parameter or signaling indicating that the DCI signaling contains the TCI field may be a parameter TCI-PresentInDCI or a parameter TCI-PresentInDCI-ForDCIFormat1_2, and furthermore, a parameter TCI-PresentInDCI-ForDCIFormat1_2 is a higher-layer parameter defined for a DCI format 1_2 newly defined for Rel-16, and other names may also be adopted. When the parameter is in an enabled state, it indicates that the DCI signaling contains the TCI field. The parameter or signaling indicating that the DCI signaling does not contain a TCI field may be the parameter TCI-PresentInDCI or the parameter TCI-PresentInDCI-ForDCIFormat1_2. And when the parameter is in a disabled (not enabled) state or when the parameter is not configured, it indicates that the DCI signaling does not contain a TCI field.

In this embodiment, the related parameter or signaling containing the TCI state mapping pattern may indicate the TCI state pattern of the at least one transmission occasion, the TCI state pattern including, for example, at most two TCI states, such as a first TCI state (TCI1) and a second TCI state (TCI2).

In this embodiment, description shall be given by taking four transmission occasions and two TCI states as examples; however, the number of transmission occasions and the number of TCI states included in the TCI state pattern are not limited in the embodiment of this disclosure.

For example, the related parameter or signaling containing the TCI state mapping pattern may be a higher-layer parameter, such as a parameter RepTCIMapping, or, a parameter CycMapping (1 2 1 2) indicating that the TCI state pattern is 1212 (i.e. TCI states for the four transmission occasions are TCI1, TCI2, TCI1, TCI2, respectively), i.e.

patterns of TCI1 and TCI2 state cyclic mapping; and a parameter indicating that the TCI state pattern is 1122 (i.e. TCI states for the four transmission occasions are TCI1, TCI2, TCI1, TCI2, respectively) is SeqMapping (1 1 2 2), i.e. patterns of sequential mapping of TCI1 and TCI2. When the number of transmission occasions is greater than 4, such as 8, if the higher-layer parameter (RepTCIMapping) of the TCI state mapping pattern is configured as CycMapping (1 2 1 2), it means that the TCI states of the 8 transmission occasions are 2 CycMapping (1 2 1 2) patterns, that is, 1 2 1 2 1 2 1 2; and if the higher-layer parameter (RepTCIMapping) of the TCI state mapping pattern is configured as SeqMapping (1 1 2 2), it means that the TCI states of the 8 transmission occasions are 2 SeqMapping (1 1 2 2) patterns, respectively, i.e. 1 1 2 2 1 1 2 2.

In this embodiment, what the terminal equipment receives may be the DCI signaling containing the TCI field, or may be the DCI signaling not containing TCI field. For example, the DCI signaling containing the TCI field may be DCI format 1_1 and DCI format 1_2, and the DCI signaling not containing a TCI field may be DCI format 1_0, DCI format 1_1 and DCI format 1_2. For DCI format 1_1, when the higher-layer parameter TCI-PresentInDCI or the higher-layer parameter TCI-PresentInDCI is configured to be in an enabled state, DCI format 1_1 contains the TCI field, and when the higher-layer parameter TCI-PresentInDCI or the higher-layer parameter TCI-PresentInDCI is not configured to be in a disabled (not enabled) state, DCI format 1_1 does not contain a TCI field. Likewise, for DCI format 1_2, when the higher-layer parameter TCI-PresentInDCI-ForDCIFormat1_2 or the higher-layer parameter TCI-PresentInDCI-ForDCIFormat1_2 is configured to be in an enabled state, DCI format 1_2 contains a TCI field, and when the TCI-PresentInDCI-ForDCIFormat1_2 or the higher-layer parameter TCI-PresentInDCI-ForDCIFormat1_2 is not configured to be in a disabled (not enabled) state, DCI format 1_2 does not contain a TCI field. And DCI format 1_0 always does not contain a TCI field.

In this embodiment, what is determined in step 202 or step 203 or step 204 is a transmission parameter of at least one transmission occasion of a transmission block, the transmission parameter including at least one of the number of TCI states and the number of transmission occasions.

In this embodiment, that the terminal equipment determines the transmission parameter of the at least one transmission occasion of the transport block may also be referred to as that the terminal equipment assumes a transmission parameter of at least one transmission occasion of a transport block.

The method for determining transmission parameters of this embodiment shall be illustrated below for various situations.

Figure 3:
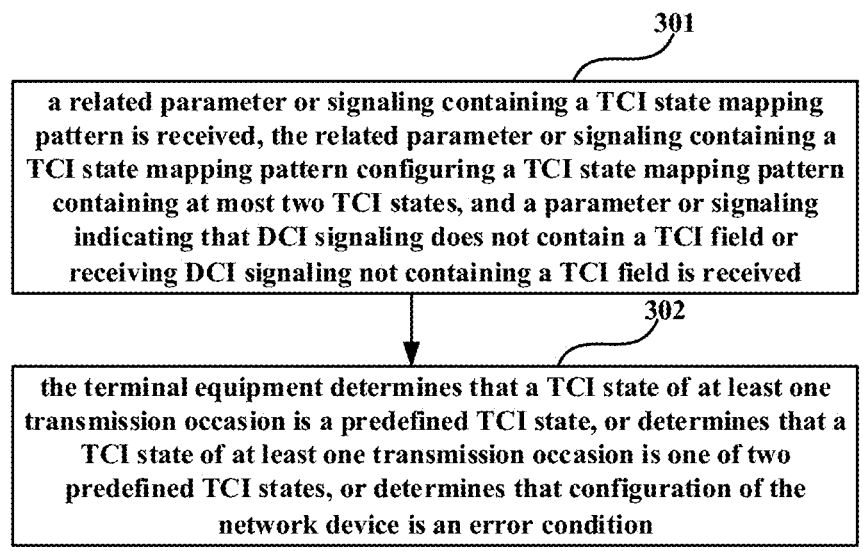
FIG. 3 is a schematic diagram of the method for determining transmission parameters of Example 1 of Embodiment 1 of this disclosure.

FIG. 3 is a schematic diagram of the method for determining transmission parameters of Example 1 of Embodiment 1 of this disclosure. As shown in FIG. 3, the method includes:

Step 301: a related parameter or signaling containing a TCI state mapping pattern is received, the related parameter or signaling containing a TCI state mapping pattern configuring a TCI state mapping pattern containing at most two TCI states, and a parameter or signaling indicating that DCI signaling does not contain a TCI field or receiving DCI signaling not containing a TCI field is received; and Step 302: the terminal equipment determines that a TCI state of at least one transmission occasion is a predefined TCI state, or determines that a TCI state of at least one transmission occasion is one of two predefined TCI states, or determines that configuration of the network device is an error condition.

In step 301, on the one hand, the received related parameter or signaling containing the TCI state mapping pattern is configured with a TCI state mapping pattern including at most two TCI states, and on the other hand, a parameter or signaling indicating that the DCI signaling does not contain a TCI field is received or DCI signaling not containing a TCI field (such as DCI format 1_0) is received, that is, according to the parameter or signaling indicating that the DCI signaling does not contain a TCI field or by receiving the DCI signaling not containing a TCI field, a TCI state configured by the related parameter or signaling containing the TCI state mapping pattern is unable to be dynamically indicated correctly.

In step 302, the terminal equipment may determine that the TCI state of the at least one transmission occasion is a predefined TCI state.

In this embodiment, the predefined TCI state is a TCI state predefined when the terminal equipment receives the parameter or signaling indicating that the DCI signaling not containing a TCI field, or receives the DCI signaling not containing a TCI field.

That is, the terminal equipment determines the TCI state of the at least one transmission occasion according to the parameter or signaling indicating that DCI signaling does not contain TCI field or the DCI signaling not containing TCI field, the TCI state being, for example, a TCI state of a CORESET used by a PDCCH scheduling a PDSCH.

Or, that is, when the related parameter or signaling containing the TCI state mapping pattern is configured with the TCI state mapping pattern containing two TCI states, the terminal equipment determines that a first TCI state and a second TCI state configured in the related parameter or signaling containing the TCI state mapping pattern are both predefined TCI states.

In this way, in a case where a TCI state in the TCI state mapping pattern configured by the related parameter containing the TCI state mapping pattern is unable to be determined according to the parameter or signaling indicating that the DCI signaling does not contain a TCI field or the DCI signaling not containing a TCI field (DCI format 1_0), both the terminal equipment and the network device deem that a TCI state is determined according to the parameter or signaling indicating that the DCI signaling does not contain a TCI field or the DCI signaling not containing a TCI field (DCI format 1_0), that is, both the terminal equipment and the network device have consistent understandings of determination of a TCI state, thereby ensuring correctness of PDSCH transmission.

In step 302, the terminal equipment may also determine that the TCI state of the at least one transmission occasion is one of two predefined TCI states.

In this embodiment, the two predefined TCI states may be: two TCI states of a CORESET used in PDCCH transmission for scheduling a PDSCH.

For example, the two TCI states of the CORESET used in PDCCH transmission for scheduling a PDSCH are: two active TCI states of the CORESET, or an active TCI state and a configured and inactivated TCI state of the CORESET.

In this embodiment, the two predefined TCI states may also be: an activated TCI state of a CORESET used in PDCCH transmission of a PDSCH, and a TCI state of a CORESET used in PDCCH transmission for scheduling a PDSCH or a TCI state of CORESETs to be monitored other than the CORESET used in PDCCH transmission for scheduling a PDSCH.

In this embodiment, the one TCI state corresponds to the first TCI state, may also correspond to the second TCI state, or may correspond to a first TCI state configured by the TCI mapping pattern, or may correspond to a second TCI state configured by the TCI mapping pattern.

For example, the TCI state of CORESETs to be monitored other than the CORESET used in PDCCH transmission for scheduling a PDSCH is: an activated TCI state of a CORESET with a lowest CORESET ID in the CORESETs to be monitored, or, an activated TCI state of a CORESET with a lowest CORESET ID in CORESETs to be monitored having an HARQ-ACK feedback codebook related higher-layer parameter different from that of the CORESET used in PDCCH transmission for scheduling a PDSCH or a higher-layer parameter different from that of the CORESET used in PDCCH transmission for scheduling a PDSCH.

In this embodiment, the two predefined TCI states may also be: TCI states of two CORESETs to be monitored having lowest numbers in two CORESET groups, or, a TCI state pair with a lowest number in TCI states activated by the PDSCH.

In this embodiment, for example, configuration of each CORESET includes a higher-layer parameter related to the HARQ-ACK feedback codebook, with a value of 0 or 1. CORESETs may be implicitly divided into two groups according to the value of the higher-layer parameter related to the HARQ-ACK feedback codebook. For example, CORESETs with all values of 0 are in a group, and CORESETs with values of 1 are in a group. Usually, the two CORESET groups are respectively associated with different TRPs, and each TRP only transmits control information within a CORESET associated therewith.

In this embodiment, the CORESET to be monitored may refer to a CORESET configured with a search space (set) to be monitored.

In this embodiment, the two predefined TCI states may be applied to at least one transmission occasion according to the TCI state mapping pattern (e.g. TCI 1 1 2 2 or TCI 1 2 1 2) configured or indicated by the related parameter or signaling containing the TCI state mapping pattern, and the two predefined TCI states correspond respectively to TCI1 and TCI2 in the TCI state mapping pattern.

In this embodiment, the TCI state pair with the lowest number in the TCI states activated by the PDSCH is a combination with the lowest number in at most 8 or 16 combinations of TCI states activated for the PDSCH. For example, at most 8 or 16 combinations of TCI states are activated for the PDSCH by using MAC-CE signaling. Taking 8 combinations as an example, each combination contains one or two TCI states, and two TCI states are a TCI state pair. The numbers may be numbers of 8 combinations, or may be numbers in other forms, such as group numbers of TCI states, and TCI state pair numbers, etc., which are not limited in the embodiment of this disclosure.

Likewise, both the network device and the terminal equipment have a consistent understanding of the determination of the TCI state, thereby ensuring correct PDSCH transmission.

In step 302, the terminal equipment may also determine that the configuration of the network device is an error condition.

In this embodiment, the error condition may include: in at least one of the following cases, the terminal equipment does not expect that the DCI signaling does not contain a TCI indication field:

the number of TCI states configured in the related parameter or signaling containing a TCI state mapping pattern is greater than 1;

a TCI state pattern configured in the related parameter or signaling containing a TCI state mapping pattern is one of patterns as follows: a first TCI state (TCI1), a second TCI state (TCI2), a first TCI state (TCI1), a second TCI state (TCI2), or a first TCI state (TCI1), a first TCI state (TCI1), a second TCI state (TCI2), a second TCI state (TCI2); or RRC configures the terminal equipment to perform a multi-TRP transmission scheme, or to perform at least one of URLLC transmission schemes 1a, 2a, 2b, 3 and 4, or an HARQ-ACK codebook related parameter is configured in a CORESET.

In this way, the terminal equipment does not expect that the above cases occur, that is, with the above configuration, in communication, the network device will ensure consistence between the TCI state according to the related parameter or signaling containing the TCI state mapping pattern and the TCI state according to the related parameter or signaling indicating that the DCI signaling does not contain a TCI field. In this way, the TCI states determined by the terminal equipment are identical, no matter it determines the TCI states according to which TCI state-related parameter, and the TCI states of the PDSCH determined by both the network device and the terminal equipment are also consistent.

Figure 4:
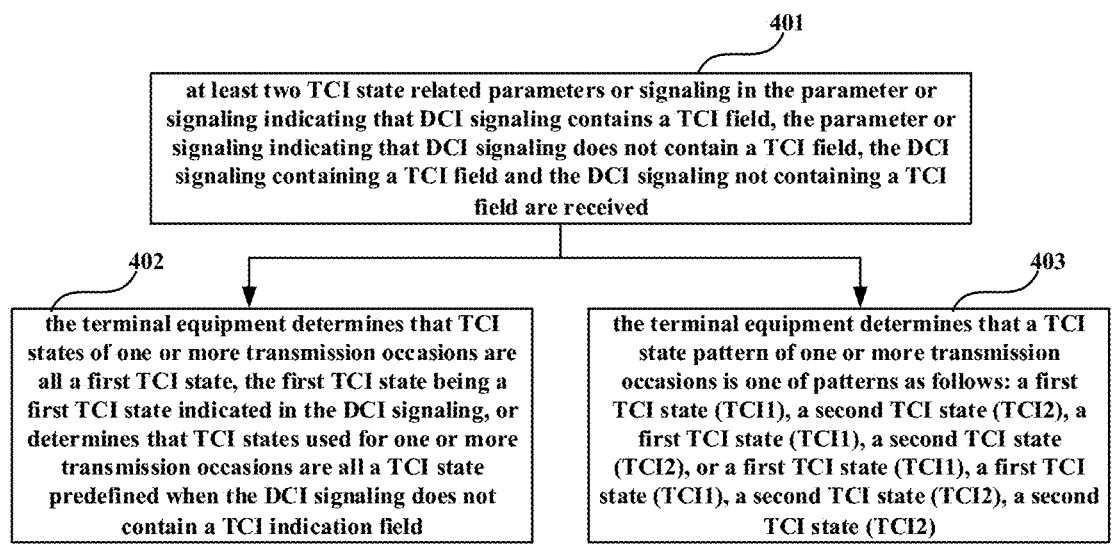
FIG. 4 is a schematic diagram of the method for determining transmission parameters of Example 2 of Embodiment 1 of this disclosure.

FIG. 4 is a schematic diagram of the method for determining transmission parameters of Example 2 of Embodiment 1 of this disclosure. As shown in FIG. 4, the method includes:

Step 401: at least two TCI state related parameters or signaling in the parameter or signaling indicating that DCI signaling contains a TCI field, the parameter or signaling indicating that DCI signaling does not contain a TCI field, the DCI signaling containing a TCI field and the DCI signaling not containing a TCI field are received; and Step 402: the terminal equipment determines that TCI states of one or more transmission occasions are all a first TCI state, the first TCI state being a first TCI state indicated in the DCI signaling, or determines that TCI states used for one or more transmission occasions are all a TCI state predefined when the DCI signaling does not contain a TCI indication field; or Step 403: the terminal equipment determines that a TCI state pattern of one or more transmission occasions is one of patterns as follows: a first TCI state (TCI1), a second TCI state (TCI2), a first TCI state (TCI1), a second TCI state (TCI2), or a first TCI state (TCI1), a first TCI state (TCI1), a second TCI state (TCI2), a second TCI state (TCI2).

In this way, when the TCI field in the DCI signaling indicates more than one TCI states but the RRC signaling does not configure a TCI state mapping pattern, by defining a default behavior of the terminal equipment, TCI states used in the transmission occasions may be determined for the terminal equipment, so that both the network device and the terminal equipment have consistent understandings of the used TCI state, thereby ensuring correct PDSCH transmission.

Figure 5:
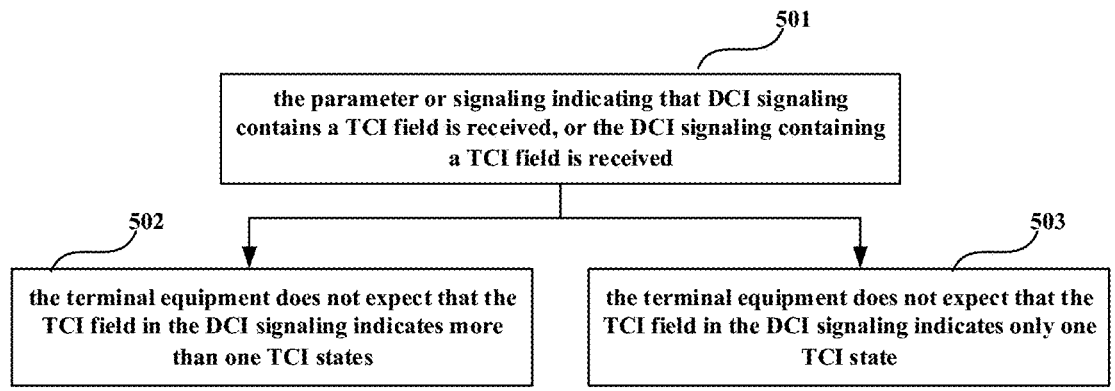
FIG. 5 is a schematic diagram of the method for determining transmission parameters of Example 3 of Embodiment 1 of this disclosure.

FIG. 5 is a schematic diagram of the method for determining transmission parameters of Example 3 of Embodiment 1 of this disclosure. As shown in FIG. 5, the method includes:

Step 501: the parameter or signaling indicating that DCI signaling contains a TCI field is received, or the DCI signaling containing a TCI field is received, Step 502: the terminal equipment does not expect that the TCI field in the DCI signaling indicates more than one TCI states, or Step 503: the terminal equipment does not expect that the TCI field in the DCI signaling indicates only one TCI state.

In step 502, for the case in step 402, that is, the terminal equipment determines that the TCI states of more than one transmission occasion are all the first TCI state, the first TCI state is a first TCI state indicated in the DCI signaling, or, it is determined that when the TCI states used in one or more transmission occasions are all a predefined TCI state when the DCI signaling contain no a TCI indication field, the terminal equipment does not expect that the TCI field in the DCI signaling indicates more than one TCI states, so as to avoid occurrence of a conflict between behaviors of the terminal equipment determined by the DCI signaling and higher-layer signaling.

In step 503, for the case in step 403, that is, when the terminal equipment determines that the TCI state pattern of one or more transmission occasions is one of the following: the first TCI state (TCI1), the second TCI state (TCI2), the first TCI state (TCI1), the second TCI state (TCI2); or the first TCI state (TCI1), the first TCI state (TCI1), the second TCI state (TCI2), the second TCI state (TCI2), the terminal equipment does not expect that the TCI field in the DCI signaling only indicates one TCI state, so as to avoid inconsistency between the number of TCI states indicated by the DCI signaling and the number of TCI states determined by the higher-layer signaling.

In this way, occurrence of inconsistence between the default behavior of the terminal equipment when no related parameter or signaling containing a TCI state mapping pattern is configured and the number of TCI states indicated by the TCI field of the DCI signaling may be avoided. Therefore, the TCI states determined by the terminal equipment according to multiple TCI-related configurations or indications are consistent, understandings of the used TCI states by both the network device and the terminal equipment may be ensured consistent, and correct PDSCH transmission may be ensured.

Figure 6:
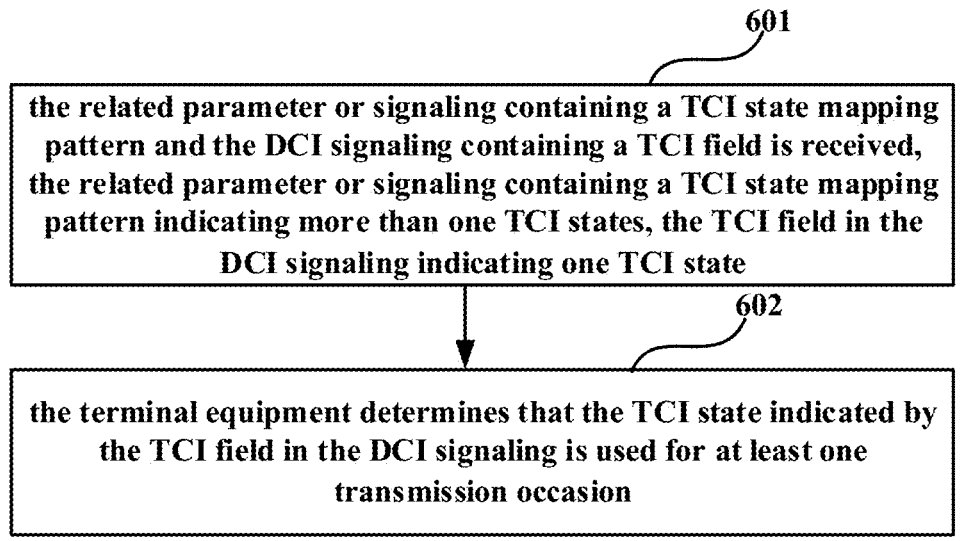
FIG. 6 is a schematic diagram of the method for determining transmission parameters of Example 4 of Embodiment 1 of this disclosure.

FIG. 6 is a schematic diagram of the method for determining transmission parameters of Example 4 of Embodiment 1 of this disclosure. As shown in FIG. 6, the method includes:

Step 601: the related parameter or signaling containing a TCI state mapping pattern and the DCI signaling containing a TCI field is received, the related parameter or signaling containing a TCI state mapping pattern indicating more than one TCI states, the TCI field in the DCI signaling indicating one TCI state; and Step 602: the terminal equipment determines that the TCI state indicated by the TCI field in the DCI signaling is used for at least one transmission occasion.

In this way, the terminal equipment determines a current TCI state by itself, thereby avoiding inconsistency between the TCI state determined by the terminal equipment and the TCI state used by the network device, and ensuring correct PDSCH transmission.

It can be seen from the above embodiment that the terminal equipment determines the transmission parameter of the at least one transmission occasion of the transport block according to the related parameter or signaling containing a TCI state mapping pattern, and a parameter or signaling indicating that DCI signaling does not contain a TCI field or a parameter or signaling indicating that DCI signaling contains a TCI field, or, according to a TCI state pattern determined by the terminal equipment and a parameter or signaling indicating that DCI signaling contains a TCI field, which may make the TCI state determined by the terminal equipment consistent with a TCI state used by the network device in performing downlink transmission, thereby ensuring correctness of PDSCH transmission.

Embodiment 2

The embodiment of this disclosure provides a method for determining transmission parameters, applicable to a terminal equipment side.

Figure 7:
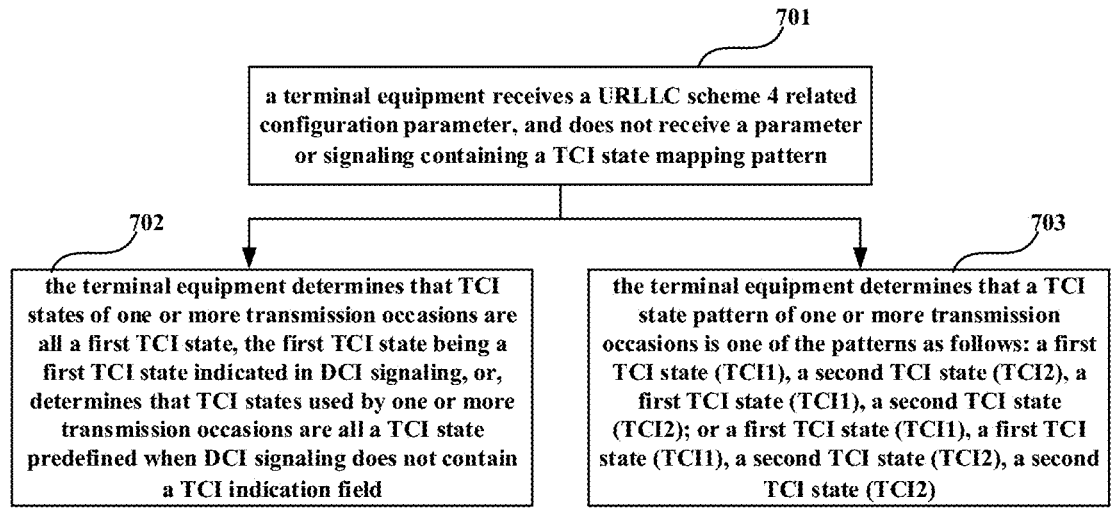
FIG. 7 is a schematic diagram of the method for determining transmission parameters of Embodiment 2 of this disclosure.

FIG. 7 is a schematic diagram of the method for determining transmission parameters of Embodiment 2 of this disclosure. As shown in FIG. 7, the method includes:

Step 701: a terminal equipment receives a URLLC scheme 4 related configuration parameter, and does not receive a parameter or signaling containing a TCI state mapping pattern; and Step 702: the terminal equipment determines that TCI states of one or more transmission occasions are all a first TCI state, the first TCI state being a first TCI state indicated in DCI signaling, or, determines that TCI states used by one or more transmission occasions are all a TCI state predefined when DCI signaling does not contain a TCI indication field, or Step 703: the terminal equipment determines that a TCI state pattern of one or more transmission occasions is one of the patterns as follows: a first TCI state (TCI1), a second TCI state (TCI2), a first TCI state (TCI1), a second TCI state (TCI2); or a first TCI state (TCI1), a first TCI state (TCI1), a second TCI state (TCI2), a second TCI state (TCI2).

In this way, when the TCI field in the DCI signaling indicates more than one TCI state but the RRC signaling is not configured with a TCI state mapping pattern, by defining the default behavior of the terminal equipment, the TCI states used in the transmission occasions may be determined for the terminal equipment, so that both the network device and the terminal equipment have a consistent understanding of the used TCI state, thereby ensuring correct PDSCH transmission.

In this example, the method may further include: when step 702 is adopted, not expecting by the terminal equipment that the TCI field in the DCI signaling indicates more than one TCI states or expecting by the terminal equipment that the TCI field in the DCI signaling indicates a TCI state, hence, inconsistence between the TCI state determined by the terminal equipment according to the related parameter or signaling including the TCI state mapping pattern and the TCI state determined according to the TCI field in the DCI signaling may be avoided.

In this embodiment, the method may further include: determining by the terminal equipment that the TCI state indicated by the TCI field in the DCI signaling is applied to at least one transmission occasion.

In this embodiment, the method may further include: when step 703 is adopted, not expecting by the terminal equipment that the TCI field in the DCI signaling indicates only one TCI state, hence, inconsistence between the TCI state determined by the terminal equipment according to the related parameter or signaling including the TCI state mapping pattern and the TCI state determined according to the TCI field in the DCI signaling may be avoided.

Embodiment 3

The embodiment of this disclosure provides a method for determining transmission parameters, applicable to a terminal equipment side.

Figure 8:
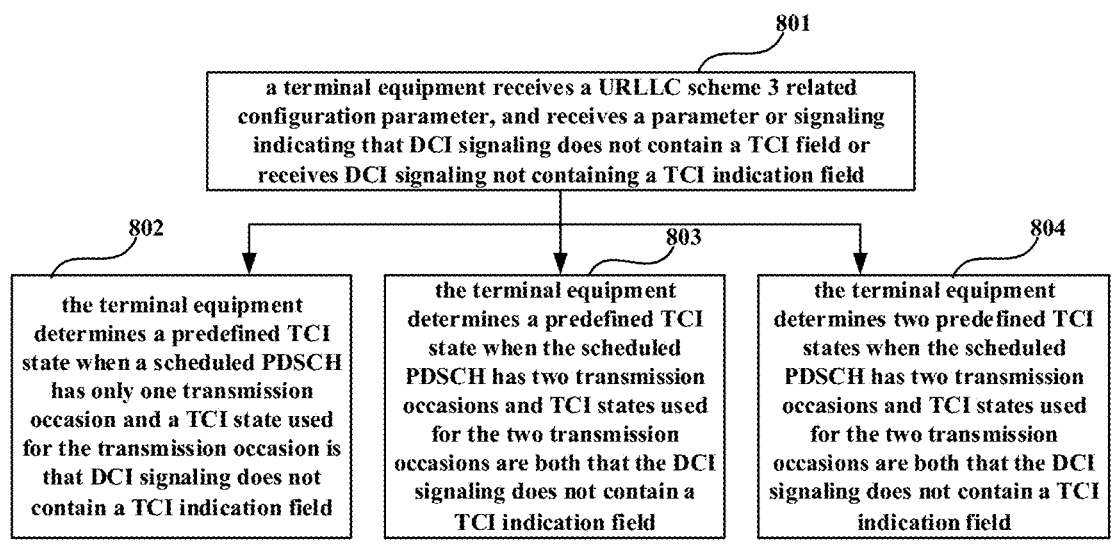
FIG. 8 is a schematic diagram of the method for determining transmission parameters of Embodiment 3 of this disclosure.

FIG. 8 is a schematic diagram of the method for determining transmission parameters of Embodiment 3 of this disclosure. As shown in FIG. 8, the method includes:

Step 801: a terminal equipment receives a URLLC scheme 3 related configuration parameter, and receives a parameter or signaling indicating that DCI signaling does not contain a TCI field or receives DCI signaling not containing a TCI indication field; and Step 802: the terminal equipment determines a predefined TCI state when a scheduled PDSCH has only one transmission occasion and a TCI state used for the transmission occasion is that DCI signaling does not contain a TCI indication field, or Step 803: the terminal equipment determines a predefined TCI state when the scheduled PDSCH has two transmission occasions and TCI states used for the two transmission occasions are both that the DCI signaling does not contain a TCI indication field, or Step 804: the terminal equipment determines two predefined TCI states when the scheduled PDSCH has two transmission occasions and TCI states used for the two transmission occasions are both that the DCI signaling does not contain a TCI indication field.

In this embodiment, the parameter or signaling indicating that the DCI signaling does not contain TCI field may be a parameter TCI-PresentInDCI or a parameter TCI-PresentIn-DCI-ForDCIFormat1_2, and when the parameter is in a disabled (not enabled) state or when the parameter is not configured, it indicates that the DCI signaling does not contain TCI field.

In this embodiment, the DCI signaling not containing a TCI field may be DCI format 1_0, DCI format 1_1 not containing a TCI field, and the DCI format 1_2 not containing TCI field.

In this embodiment, the two predefined TCI states may be: two TCI states of a CORESET used in PDCCH transmission for scheduling a PDSCH; or, an activated TCI state of a CORESET used in PDCCH transmission of a PDSCH, and a TCI state of CORESETs to be monitored other than the CORESET used in PDCCH transmission for scheduling a PDSCH; or, TCI states of two CORESETs to be monitored having lowest numbers in two CORESET groups; or, a TCI state pair with a lowest number in TCI states activated by the PDSCH.

For example, the two TCI states of the CORESET used in PDCCH transmission for scheduling a PDSCH are: two active TCI states of the CORESET, or an active TCI state and a configured and inactivated TCI state of the CORESET.

For example, the TCI state of CORESETs to be monitored other than the CORESET used in PDCCH transmission for scheduling a PDSCH is: an activated TCI state of a CORESET with a lowest CORESET ID in the CORESETs to be monitored, or, an activated TCI state of a CORESET having a lowest CORESET ID in CORESETs to be monitored and having an HARQ-ACK feedback codebook related higher-layer parameter different from that of the CORESET used in PDCCH transmission for scheduling a PDSCH.

In this way, for URLLC scheme 3, the terminal equipment may be prevented from determining a current TCI state and the number of transmission occasions by itself, thereby ensuring that both the network device and the terminal equipment have a consistent understanding of the number of transmission occasions and the TCI state used for transmission, and ensuring correct PDSCH transmission.

Embodiment 4

The embodiment of this disclosure provides a method for determining transmission parameters, applicable to a network device side. This method corresponds to Embodiment 1, and reference may be made to the disclosure contained in Embodiment 1 for particular implementations of this method, with identical contents being not going to be described herein any further.

FIG. 9 is a schematic diagram of the method for determining transmission parameters of Embodiment 4 of this disclosure. As shown in FIG. 9, the method includes:

Step 901: at least two TCI state related parameters or signaling are configured or indicated to a terminal equipment, so that the terminal equipment determines a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or so that the terminal equipment determines a transmission parameter of at least one transmission occasion of a transport block according to a related parameter or signaling containing a TCI state mapping pattern, and DCI signaling not containing a TCI field, in the at least two TCI state related parameters or signaling, or so that the terminal equipment determines a transmission parameter of at least one transmission occasion of a transport block according to a TCI state pattern determined by the terminal equipment and a parameter or signaling indicating that DCI signaling contains a TCI field in the at least two TCI state related parameters or signaling.

In this embodiment, the TCI state related parameter or signaling may include at least two of the following parameters or signaling: a parameter or signaling indicating that DCI signaling contains a TCI field; a parameter or signaling indicating that DCI signaling does not contain a TCI field; a related parameter or signaling containing a TCI state mapping pattern; DCI signaling containing a TCI field; or DCI signaling not containing a TCI field.

In this embodiment, the transmission parameter may include at least one of a TCI state and the number of transmission occasions.

For example, the TCI state related parameter or signaling configured or indicated by the network device includes: a related parameter or signaling containing a TCI state mapping pattern and DCI signaling containing a TCI field, and the number of TCI states indicated by the related parameter containing the TCI state mapping pattern is in consistence with the number of TCI states indicated by the TCI field in the DCI signaling.

It can be seen from the above embodiment that the terminal equipment determines the transmission parameter of the at least one transmission occasion of the transport block according to the related parameter or signaling containing a TCI state mapping pattern, and a parameter or signaling indicating that DCI signaling does not contain a TCI field or a parameter or signaling indicating that DCI signaling contains a TCI field, or, according to a related parameter or signaling containing a TCI state mapping pattern which is configured and indicated by the network device, and DCI signaling not containing a TCI field, or, according to a TCI state pattern determined by the terminal equipment and a parameter or signaling indicating that DCI signaling contains a TCI field, which may make the TCI state determined by the terminal equipment consistent with a TCI state used by the network device in performing downlink transmission, thereby ensuring correctness of PDSCH transmission.

Embodiment 5

The embodiment of this disclosure provides a method for determining transmission parameters, applicable to a terminal equipment side and a network device side. This method corresponds to embodiments 1 and 4, and reference may be made to the disclosure contained in embodiments 1 and 4 for particular implementations of this method, with identical contents being not going to be described herein any further.

Figure 10:
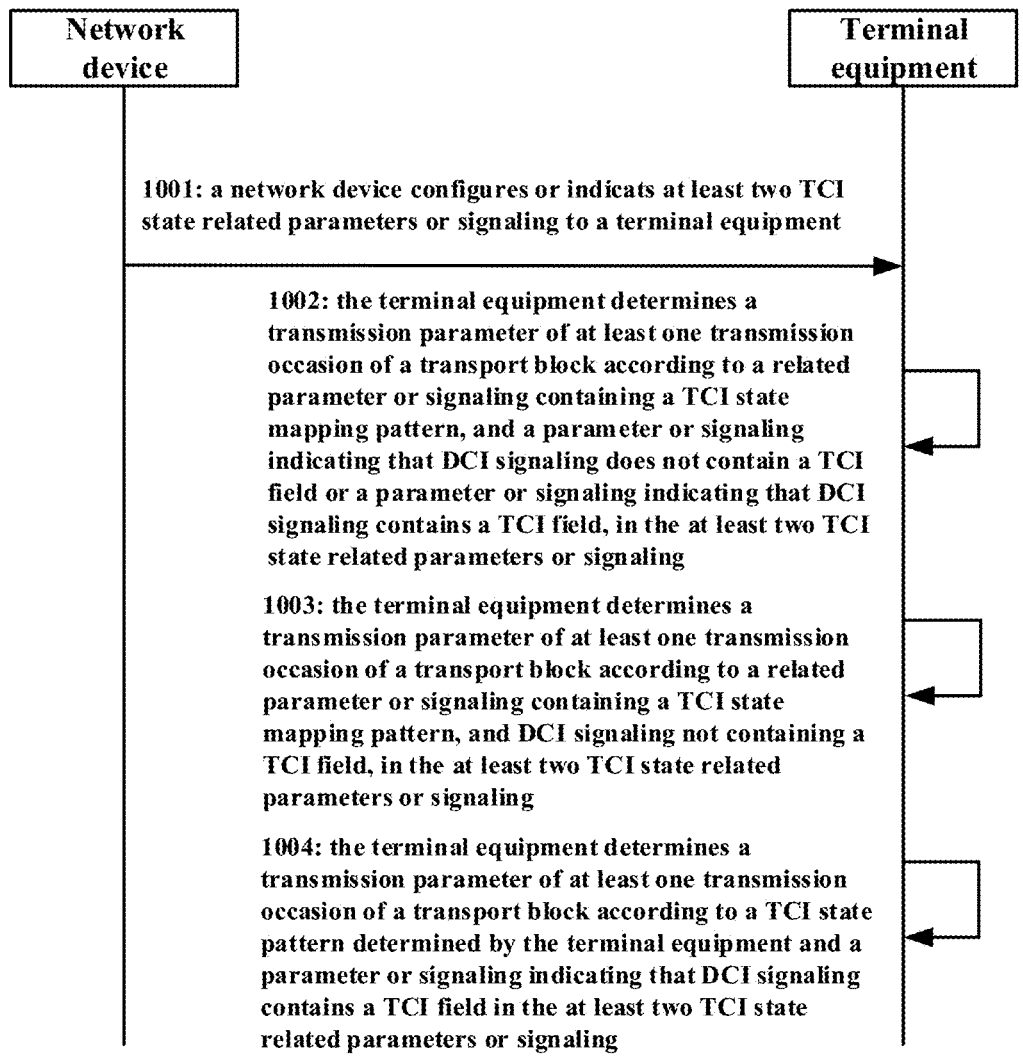
FIG. 10 is a schematic diagram of the method for determining transmission parameters of Embodiment 5 of this disclosure.

FIG. 10 is a schematic diagram of the method for determining transmission parameters of Embodiment 5 of this disclosure. As shown in FIG. 10, the method includes:

Step 1001: a network device configures or indicates at least two TCI state related parameters or signaling to a terminal equipment;

Step 1002: the terminal equipment determines a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or Step 1003: the terminal equipment determines a transmission parameter of at least one transmission occasion of a transport block according to a related parameter or signaling containing a TCI state mapping pattern, and DCI signaling not containing a TCI field, in the at least two TCI state related parameters or signaling, or.

Step 1004: the terminal equipment determines a transmission parameter of at least one transmission occasion of a transport block according to a TCI state pattern determined by the terminal equipment and a parameter or signaling indicating that DCI signaling contains a TCI field in the at least two TCI state related parameters or signaling.

In this embodiment, reference may be made to the disclosure contained in embodiments 1 and 4 for particular implementations of steps 1001-1004, which shall not be described herein any further.

It can be seen from the above embodiment that the terminal equipment determines the transmission parameter of the at least one transmission occasion of the transport block according to the related parameter or signaling containing a TCI state mapping pattern, and a parameter or signaling indicating that DCI signaling does not contain TCI field or a parameter or signaling indicating that DCI signaling contains a TCI field, or, according to a related parameter or signaling containing a TCI state mapping pattern which is configured and indicated by the network device, and DCI signaling not containing a TCI field, or, according to a TCI state pattern determined by the terminal equipment and a parameter or signaling indicating that DCI signaling contains a TCI field, which may make the TCI state determined by the terminal equipment consistent with a TCI state used by the network device in performing downlink transmission, thereby ensuring correctness of PDSCH transmission.

Embodiment 6

The embodiment of this disclosure provides an apparatus for determining transmission parameters, configured at a terminal equipment side. As a principle of the apparatus for solving problems is similar to that of the method of Embodiment 1, reference may be made to the implementations of the method of Embodiment 1 for implementations of this apparatus, with identical or related parts being not going to be described herein any further.

Figure 11:
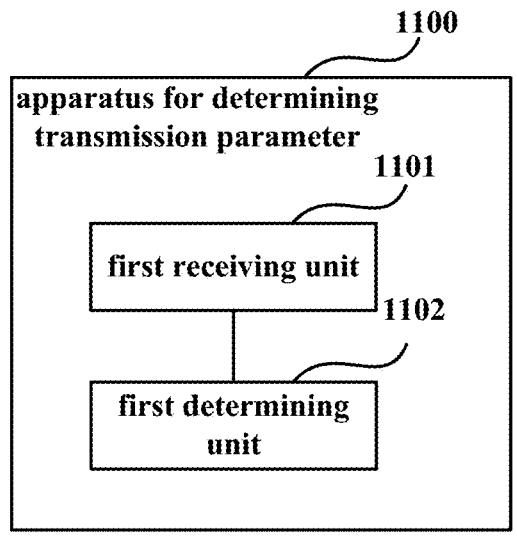
FIG. 11 is a schematic diagram of the apparatus for determining transmission parameters of Embodiment 6 of this disclosure.

FIG. 11 is a schematic diagram of the apparatus for determining a transmission parameter of Embodiment 6 of this disclosure. As shown in FIG. 11, an apparatus 1100 includes:

a first receiving unit 1101 configured to receive at least two TCI state related parameters or signaling configured or indicated by a network device; and a first determining unit 1102 configured to determine a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or determine a transmission parameter of at least one transmission occasion of a transport block according to a related parameter or signaling containing a TCI state mapping pattern, and DCI signaling not containing a TCI field, in the at least two TCI state related parameters or signaling, or determine a transmission parameter of at least one transmission occasion of a transport block according to a TCI state pattern determined by the terminal equipment and a parameter or signaling indicating that DCI signaling contains a TCI field in the at least two TCI state related parameters or signaling.

Furthermore, the first receiving unit 1101 receives at least two of the following parameters or signaling: a parameter or signaling indicating that DCI signaling contains a TCI field; a parameter or signaling indicating that DCI signaling does not contain a TCI field; a related parameter or signaling containing a TCI state mapping pattern; DCI signaling containing a TCI field; and DCI signaling not containing a TCI field.

The apparatus may further include: a second determining unit configured to determine that TCI states of one or more transmission occasions are all a first TCI state, the first TCI state being a first TCI state indicated in the DCI signaling, or determine that TCI states used for one or more transmission occasions are all a TCI state predefined when the DCI signaling does not contain a TCI indication field; or a third determining unit configured to determine that a TCI state pattern of one or more transmission occasions is one of patterns as follows: a first TCI state (TCI1), a second TCI state (TCI2), a first TCI state (TCI1), a second TCI state (TCI2), or a first TCI state (TCI1), a first TCI state (TCI1), a second TCI state (TCI2), a second TCI state (TCI2).

In this embodiment, reference may be made to related steps in Embodiment 1 for implementations of functions of the above units, which shall not be described herein any further.

It can be seen from the above embodiment that the terminal equipment determines the transmission parameter of the at least one transmission occasion of the transport block according to the related parameter or signaling containing a TCI state mapping pattern, and a parameter or signaling indicating that DCI signaling does not contain TCI field or a parameter or signaling indicating that DCI signaling contains a TCI field, or, according to a related parameter or signaling containing a TCI state mapping pattern and DCI signaling not containing a TCI field, in the at least two TCI state related parameters or signaling, or, according to a TCI state pattern determined by the terminal equipment and a parameter or signaling indicating that DCI signaling contains a TCI field, which may make the TCI state determined by the terminal equipment consistent with a TCI state used by the network device in performing downlink transmission, thereby ensuring correctness of PDSCH transmission.

Embodiment 7

The embodiment of this disclosure provides an apparatus for determining transmission parameters, configured at a terminal equipment side. As a principle of the apparatus for solving problems is similar to that of the method of Embodiment 2, reference may be made to the implementations of the method of Embodiment 2 for implementations of this apparatus, with identical or related parts being not going to be described herein any further.

Figure 12:
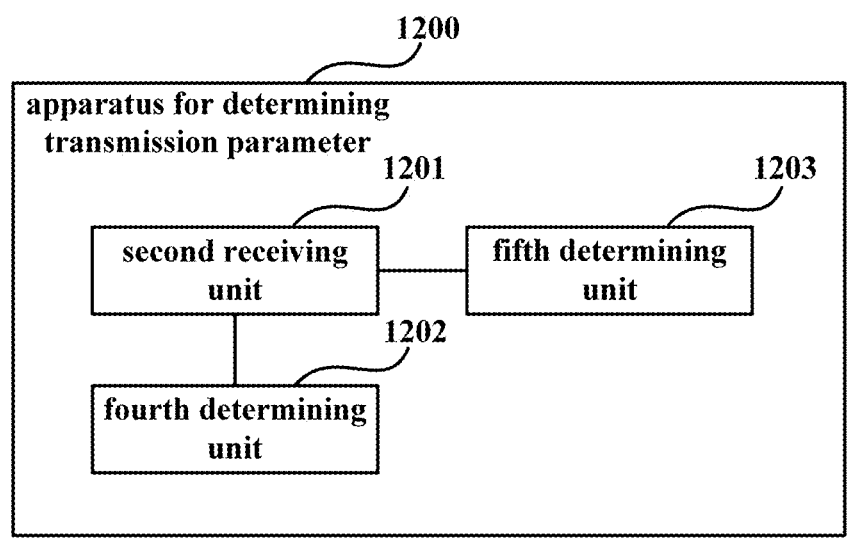
FIG. 12 is a schematic diagram of the apparatus for determining transmission parameters of Embodiment 7 of this disclosure.

FIG. 12 is a schematic diagram of the apparatus for determining a transmission parameter of Embodiment 7 of this disclosure. As shown in FIG. 12, an apparatus 1200 includes:

a second receiving unit 1201 configured to receive at least two TCI state related parameters or signaling in a parameter or signaling indicating that DCI signaling contains a TCI field, a parameter or signaling indicating that the DCI signaling does not contain a TCI field, DCI signaling containing a TCI field and DCI signaling not containing a TCI field; and a fourth determining unit 1202 configured to determine that TCI states of one or more transmission occasions are all first TCI states, the first TCI states being first TCI states indicated in the DCI signaling, or, configured to determine that TCI states used by one or more transmission occasions are all TCI states predefined when the DCI signaling does not contain TCI indication field; or, a fifth determining unit 1203 configured to determine that a TCI state pattern of one or more transmission occasions is one of the patterns as follows: first TCI state (TCI1), second TCI state (TCI2), first TCI state (TCI1), second TCI state (TCI2); or first TCI state (TCI1), first TCI state (TCI1), second TCI state (TCI2), second TCI state (TCI2).

In this embodiment, reference may be made to related steps in Embodiment 2 for implementations of functions of the above units, which shall not be described herein any further.

In this way, when the TCI field in the DCI signaling indicates more than one TCI states but the RRC signaling does not configure a TCI state mapping pattern, by defining a default behavior of the terminal equipment, TCI states used in the transmission occasions may be determined for the terminal equipment, so that both the network device and the terminal equipment have consistent understandings of the used TCI state, thereby ensuring correct PDSCH transmission.

Embodiment 8

The embodiment of this disclosure provides an apparatus for determining transmission parameters, configured at a terminal equipment side. As a principle of the apparatus for solving problems is similar to that of the method of Embodiment 3, reference may be made to the implementations of the method of Embodiment 3 for implementations of this apparatus, with identical or related parts being not going to be described herein any further.

Figure 13:
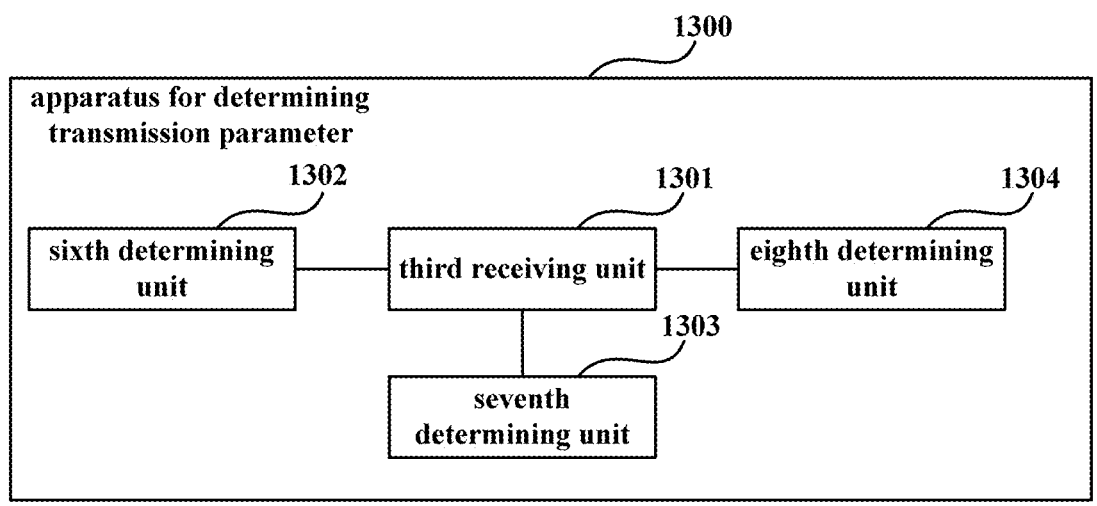
FIG. 13 is a schematic diagram of the apparatus for determining transmission parameters of Embodiment 8 of this disclosure.

FIG. 13 is a schematic diagram of the apparatus for determining a transmission parameter of Embodiment 8 of this disclosure. As shown in FIG. 13, an apparatus 1300 includes:

a third receiving unit 1301 configured to receive a URLLC scheme 3 related configuration parameter, and receive a parameter or signaling indicating that DCI signaling does not contain a TCI field or DCI signaling not containing a TCI field; and a sixth determining unit 1302 configured to determine a predefined TCI state when a scheduled PDSCH has only one transmission occasion and a TCI state used for the transmission occasion is that DCI signaling does not contain a TCI indication field, or a seventh determining unit 1303 configured to determine a predefined TCI state when the scheduled PDSCH has two transmission occasions and TCI states used for the two transmission occasions are both that the DCI signaling does not contain a TCI indication field, or an eighth determining unit 1304 configured to determine two predefined TCI states when the scheduled PDSCH has two transmission occasions and TCI states used for the two transmission occasions are both that the DCI signaling does not contain a TCI indication field.

In this embodiment, reference may be made to related steps in Embodiment 3 for implementations of functions of the above units, which shall not be described herein any further.

In this way, for URLLC scheme 3, the terminal equipment may be prevented from determining a current TCI state and the number of transmission occasions by itself, thereby ensuring that both the network device and the terminal equipment have a consistent understanding of the number of transmission occasions and the TCI state used for transmission, and ensuring correct PDSCH transmission.

Embodiment 9

The embodiment of this disclosure provides an apparatus for determining transmission parameters, configured at a terminal equipment side. As a principle of the apparatus for solving problems is similar to that of the method of Embodiment 4, reference may be made to the implementations of the method of Embodiment 4 for implementations of this apparatus, with identical or related parts being not going to be described herein any further.

Figure 14:
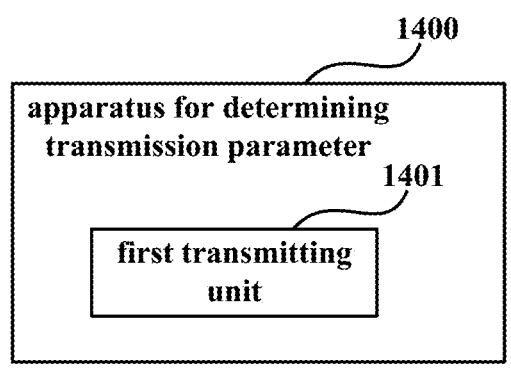
FIG. 14 is a schematic diagram of the apparatus for determining transmission parameters of Embodiment 9 of this disclosure.

FIG. 14 is a schematic diagram of the apparatus for determining a transmission parameter of Embodiment 9 of this disclosure. As shown in FIG. 14, an apparatus 1400 includes:

a first transmitting unit 1401 configured to configure or indicate at least two TCI state related parameters or signaling to a terminal equipment, so that the terminal equipment determines a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or so that the terminal equipment determines a transmission parameter of at least one transmission occasion of a transport block according to a related parameter or signaling containing a TCI state mapping pattern, and DCI signaling not containing a TCI field, in the at least two TCI state related parameters or signaling, or so that the terminal equipment determines a transmission parameter of at least one transmission occasion of a transport block according to a TCI state pattern determined by the terminal equipment and a parameter or signaling indicating that DCI signaling contains a TCI field in the at least two TCI state related parameters or signaling.

In this embodiment, reference may be made to related steps in Embodiment 4 for implementations of functions of the above units, which shall not be described herein any further.

It can be seen from the above embodiment that the terminal equipment determines the transmission parameter of the at least one transmission occasion of the transport block according to the related parameter or signaling containing a TCI state mapping pattern, and a parameter or signaling indicating that DCI signaling does not contain TCI field or a parameter or signaling indicating that DCI signaling contains a TCI field, or, according to a related parameter or signaling containing a TCI state mapping pattern and DCI signaling not containing a TCI field, in the at least two TCI state related parameters or signaling, or, according to a TCI state pattern determined by the terminal equipment and a parameter or signaling indicating that DCI signaling contains a TCI field, which may make the TCI state determined by the terminal equipment consistent with a TCI state used by the network device in performing downlink transmission, thereby ensuring correctness of PDSCH transmission.

Embodiment 10

The embodiment of this disclosure provides a terminal equipment, including the apparatus for determining transmission parameters as described in Embodiment 6 or Embodiment 7 or Embodiment 8.

Figure 15:
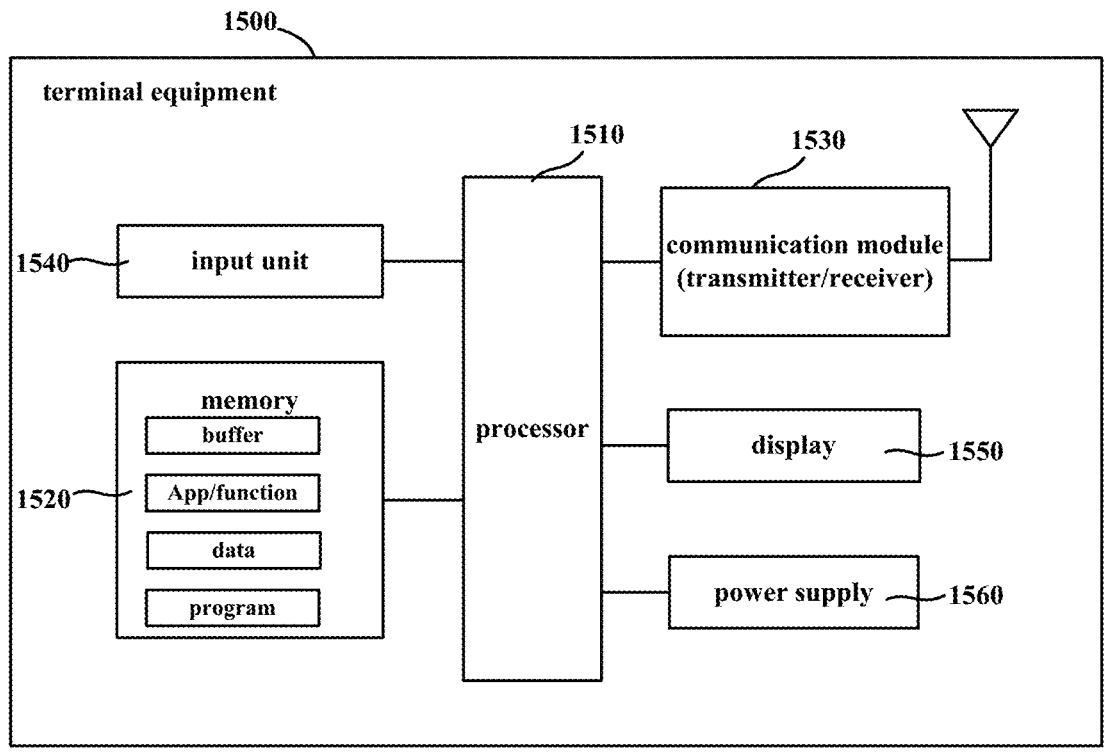
FIG. 15 is a block diagram of a systematic structure of the terminal equipment of Embodiment 10 of this disclosure.

FIG. 15 is a block diagram of a structure of the terminal equipment of Embodiment 10 of this disclosure. As shown in FIG. 15, a terminal equipment 1500 may include a processor 1510 and a memory 1520, the memory 1520 being coupled to the processor 1510. It should be noted that this figure is illustrative only, and other types of structures may also be used, so as to supplement or replace this structure and achieve a telecommunications function or other functions.

In one implementation, the functions of the apparatus for determining transmission parameters may be integrated into the processor 1510. The processor 1510 may be configured to: receive at least two TCI state related parameters or signaling configured or indicated by a network device; and determine a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or determine a transmission parameter of at least one transmission occasion of a transport block according to a related parameter or signaling containing a TCI state mapping pattern, and DCI signaling not containing a TCI field, in the at least two TCI state related parameters or signaling, or determine a transmission parameter of at least one transmission occasion of a transport block according to a TCI state pattern determined by the terminal equipment and a parameter or signaling indicating that DCI signaling contains a TCI field in the at least two TCI state related parameters or signaling.

Or, the processor 1510 may be configured to: receive at least two TCI state related parameters or signaling in a parameter or signaling indicating that DCI signaling contains a TCI field, a parameter or signaling indicating that the DCI signaling does not contain a TCI field, DCI signaling containing a TCI field and DCI signaling not containing a TCI field; or, determine that TCI states of one or more transmission occasions are all first TCI states, the first TCI states being first TCI states indicated in the DCI signaling, or, configured to determine that TCI states used by one or more transmission occasions are all TCI states predefined when the DCI signaling does not contain TCI indication field; or, determine that a TCI state pattern of one or more transmission occasions is one of the patterns as follows: first TCI state (TCI1), second TCI state (TCI2), first TCI state (TCI1), second TCI state (TCI2); or first TCI state (TCI1), first TCI state (TCI1), second TCI state (TCI2), second TCI state (TCI2).

Or, the processor 1510 may be configured to: receive a URLLC scheme 3 related configuration parameter, and receive a parameter or signaling indicating that DCI signaling does not contain a TCI field or DCI signaling not containing a TCI field; and determine a predefined TCI state when a scheduled PDSCH has only one transmission occasion and a TCI state used for the transmission occasion is that DCI signaling does not contain a TCI indication field; or, determine a predefined TCI state when the scheduled PDSCH has two transmission occasions and TCI states used for the two transmission occasions are both that the DCI signaling does not contain a TCI indication field.

In another implementation, the apparatus for determining transmission parameters and the processor 1510 may be configured separately; for example, the apparatus for determining transmission parameters may be configured as a chip connected to the processor 1510, and the functions of the apparatus for determining transmission parameters are executed under control of the processor 1510.

As shown in FIG. 15, the terminal equipment 1500 may further include a communication module 1530, an input unit 1540, a display 1550 and a power supply 1560. It should be noted that the terminal equipment 1500 does not necessarily include all the parts shown in FIG. 15. Furthermore, the terminal equipment 1500 may include parts not shown in FIG. 15, and the related art may be referred to.

As shown in FIG. 15, the processor 1510 is sometimes referred to as a controller or an operational control, which may include a microprocessor or other processor devices and/or logic devices. The processor 1510 receives input and controls operations of components of the terminal equipment 1500.

The memory 1520 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 1510 may execute programs stored in the memory 1520, so as to realize information storage or processing, etc. Functions of other parts are similar to those of the related art, which shall not be described herein any further. The parts of the terminal equipment 1500 may be realized by specific hardware, firmware, software, or any combination thereof, without departing from the scope of this disclosure.

It can be seen from the above embodiment that the terminal equipment determines the transmission parameter of the at least one transmission occasion of the transport block according to the related parameter or signaling containing a TCI state mapping pattern, and a parameter or signaling indicating that DCI signaling does not contain TCI field or a parameter or signaling indicating that DCI signaling contains a TCI field, or, according to a related parameter or signaling containing a TCI state mapping pattern and DCI signaling not containing a TCI field, in the at least two TCI state related parameters or signaling, or, according to a TCI state pattern determined by the terminal equipment and a parameter or signaling indicating that DCI signaling contains a TCI field, which may make the TCI state determined by the terminal equipment consistent with a TCI state used by the network device in performing downlink transmission, thereby ensuring correctness of PDSCH transmission.

Embodiment 11

The embodiment of this disclosure provides a network device, including the apparatus for determining transmission parameters described in Embodiment 9.

Figure 16:
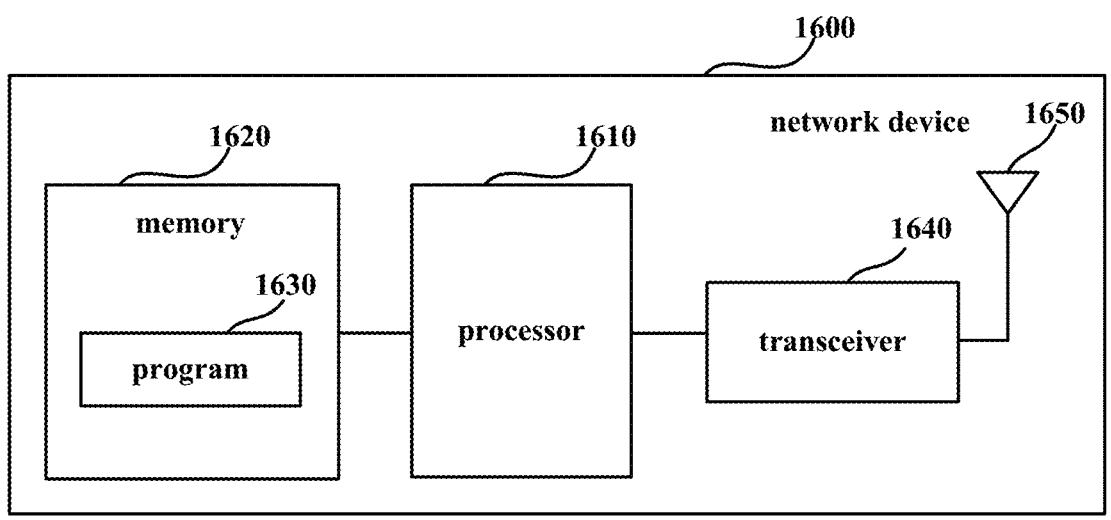
FIG. 16 is a schematic diagram of a structure of the network device of Embodiment 11 of this disclosure.

FIG. 16 is a schematic diagram of a structure of the network device of Embodiment 11 of this disclosure. As shown in FIG. 16, a network device 1600 may include a processor 1610 and a memory 1620, the memory 1620 being coupled to the processor 1610. The memory 1620 may store various data, and furthermore, it may store a program 1630 for data processing, and execute the program 1630 under control of the processor 1610, so as to receive various information transmitted by a terminal equipment, and transmit various information to the terminal equipment.

In one implementation, the functions of the apparatus for determining transmission parameters may be integrated into the processor 1610. The processor 1610 may be configured to: configure or indicate at least two TCI state related parameters or signaling to a terminal equipment, so that the terminal equipment determines a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or so that the terminal equipment determines a transmission parameter of at least one transmission occasion of a transport block according to a related parameter or signaling containing a TCI state mapping pattern, and DCI signaling not containing a TCI field, in the at least two TCI state related parameters or signaling, or so that the terminal equipment determines a transmission parameter of at least one transmission occasion of a transport block according to a TCI state pattern determined by the terminal equipment and a parameter or signaling indicating that DCI signaling contains a TCI field in the at least two TCI state related parameters or signaling.

In another implementation, the apparatus for determining transmission parameters and the processor 1610 may be configured separately; for example, the apparatus for determining transmission parameters may be configured as a chip connected to the processor 1610, and the functions of the apparatus for determining transmission parameters are executed under control of the processor 1610.

Furthermore, as shown in FIG. 16, the network device 1600 may further include a transceiver 1640, and an antenna 1650, etc. Functions of the above components are similar to those in the related art, and shall not be described herein any further. It should be noted that the network device 1600 does not necessarily include all the parts shown in FIG. 16. Furthermore, the network device 1600 may include parts not shown in FIG. 16, and the related art may be referred to.

It can be seen from the above embodiment that the terminal equipment determines the transmission parameter of the at least one transmission occasion of the transport block according to the related parameter or signaling containing a TCI state mapping pattern and a parameter or signaling indicating that DCI signaling does not contain a TCI field configured or indicated by the network device, or, according to a parameter or signaling indicating that DCI signaling contains a TCI field in the at least two TCI state related parameters or signaling, or, according to a TCI state pattern determined by the terminal equipment and a parameter or signaling indicating that DCI signaling contains a TCI field, which may make the TCI state determined by the terminal equipment consistent with a TCI state used by the network device in performing downlink transmission, thereby ensuring correctness of PDSCH transmission.

Embodiment 12

The embodiment of this disclosure provides a communication system, including the terminal equipment described in Embodiment 10 and/or the network device described in Embodiment 11.

For example, reference may be made to FIG. 1 for a structure of the communication system. As shown in FIG. 1, the communication system 100 includes a network device 101 and a terminal equipment 102. The terminal equipment 102 is identical to the terminal equipment described in Embodiment 10, and the network device 101 is identical to the network device in Embodiment 11, with identical contents being not going to be described herein any further.

It can be seen from the above embodiment that the terminal equipment determines the transmission parameter of the at least one transmission occasion of the transport block according to the related parameter or signaling containing a TCI state mapping pattern and a parameter or signaling indicating that DCI signaling does not contain TCI field configured or indicated by the network device, or, according to a parameter or signaling indicating that DCI signaling contains a TCI field in the at least two TCI state related parameters or signaling, or, according to a TCI state pattern determined by the terminal equipment and a parameter or signaling indicating that DCI signaling contains a TCI field, which may make the TCI state determined by the terminal equipment consistent with a TCI state used by the network device in performing downlink transmission, thereby ensuring correctness of PDSCH transmission.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 11 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 11 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 11 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

According to the above implementations disclosed in the embodiments, following supplements are further disclosed.

Supplement I

1. A method for determining a transmission parameter, applicable to a terminal equipment side, the method including:

receiving at least two TCI state related parameters or signaling configured or indicated by a network device; and determining a transmission parameter of at least one transmission occasion of a transport block according to the at least two TCI state related parameters or signaling.

2. The method according to supplement 1, wherein the TCI state related parameter or signaling includes at least two of the following parameters or signaling:

a parameter or signaling indicating that DCI signaling contains a TCI field;

a parameter or signaling indicating that DCI signaling does not contain a TCI field;

a related parameter or signaling containing a TCI state mapping pattern;

DCI signaling containing a TCI field; or

DCI signaling not containing a TCI field.

3. The method according to supplement 1 or 2, wherein, the transmission parameter includes at least one of a TCI state or the number of transmission occasions.

4. The method according to any one of supplements 1-3, wherein, the receiving at least two TCI state related parameters or signaling configured or indicated by a network device includes: receiving a related parameter or signaling containing a TCI state mapping pattern, and a parameter or signaling indicating that DCI signaling does not contain a TCI field or DCI signaling not containing a TCI field, and the determining a transmission parameter of at least one transmission occasion of a transport block according to the at least two TCI state related parameters or signaling includes: determining a transmission parameter of at least one transmission occasion of a transport block according to the related parameter or signaling containing a TCI state mapping pattern and the parameter or signaling indicating that DCI signaling does not contain a TCI field and/or the DCI signaling not containing a TCI field;

or, the receiving at least two TCI state related parameters or signaling configured or indicated by a network device includes: receiving at least two TCI state related parameters or signaling in a parameter or signaling indicating that DCI signaling contains a TCI field, a parameter or signaling indicating that DCI signaling does not contain a TCI field, DCI signaling containing a TCI field and DCI signaling not containing a TCI field, and the determining a transmission parameter of at least one transmission occasion of a transport block according to the at least two TCI state related parameters or signaling includes: determining a TCI state pattern by the terminal equipment;

or, the receiving at least two TCI state related parameters or signaling configured or indicated by a network device includes: receiving a related parameter or signaling containing a TCI state mapping pattern and DCI signaling containing a TCI field, and the determining a transmission parameter of at least one transmission occasion of a transport block according to the at least two TCI state related parameters or signaling includes: determining a transmission parameter of at least one transmission occasion of a transport block according to the related parameter or signaling containing a TCI state mapping pattern and the parameter or signaling indicating that DCI signaling contains a TCI field and/or the DCI signaling containing a TCI field.

5. The method according to any one of supplements 1-4, wherein the receiving at least two TCI state related parameters or signaling configured or indicated by a network device includes:

receiving the related parameter or signaling containing a TCI state mapping pattern, the related parameter or signaling containing a TCI state mapping pattern being configured with a TCI state mapping pattern containing at most two TCI states, and receiving the parameter or signaling indicating that DCI signaling does not contain a TCI field or receiving the DCI signaling not containing a TCI field, and the determining a transmission parameter of at least one transmission occasion of a transport block according to the at least two TCI state related parameters or signaling includes:

determining by the terminal equipment that a TCI state of the at least one transmission occasion is a predefined TCI state, or determining by the terminal equipment that a TCI state of the at least one transmission occasion is one of two predefined TCI states, or determining by the terminal equipment that the configuration of the network device is an error condition.

6. The method according to supplement 5, wherein the predefined TCI state is a TCI state predefined in a case where the terminal equipment receives the parameter or signaling indicating that DCI signaling does not contain a TCI field, or receives the DCI signaling not containing a TCI field.

7. The method according to supplement 5, wherein the two predefined TCI states are:
two TCI states of a CORESET used in PDCCH transmission for scheduling a PDSCH, or
that one TCI state is an activated TCI state of a CORESET used in PDCCH transmission for scheduling a PDSCH, and the other TCI state is a TCI state of a CORESET to be monitored other than the CORESET used in PDCCH transmission scheduling a PDSCH, or
TCI states of two CORESETs to be monitored having lowest numbers in two CORESET groups, or
a TCI state pair having a lowest number in TCI states activated by a PDSCH.

8. The method according to supplement 7, wherein the two TCI states of a CORESET used in PDCCH transmission for scheduling a PDSCH are:
two activated TCI states of the CORESET, or
an activated TCI state and a configured and inactivated TCI state of the CORESET.

9. The method according to supplement 7, wherein the TCI state of a CORESET to be monitored other than the CORESET used in PDCCH transmission for scheduling a PDSCH is:
an activated TCI state of a CORESET having a lowest CORESET ID in the CORESETs to be monitored, or
an activated TCI state of a CORESET having a lowest CORESET ID in the CORESETs to be monitored and having an HARQ-ACK feedback codebook related higher-layer parameter different from that of the CORESET used in PDCCH transmission for scheduling a PDSCH.

10. The method according to supplement 5, wherein the error condition includes:
that the terminal equipment does not expect that DCI signaling does not contain a TCI indication field in at least one of the following cases where:
the number of TCI states configured in the related parameter or signaling containing a TCI state mapping pattern is greater than 1;
a TCI state pattern configured in the related parameter or signaling containing a TCI state mapping pattern is one of patterns as follows: a first TCI state (TCI1), a second TCI state (TCI2), a first TCI state (TCI1), a second TCI state (TCI2), or a first TCI state (TCI1), a first TCI state (TCI1), a second TCI state (TCI2), a second TCI state (TCI2); or
RRC configures the terminal equipment to perform a multi-TRP transmission scheme, or to perform at least one of URLLC transmission schemes 1a, 2a, 2b, 3 and 4, or an HARQ-ACK codebook related parameter is configured in a CORESET.

11. The method according to any one of supplements 1-4, wherein,
the receiving at least two TCI state related parameters or signaling configured or indicated by a network device includes:
receiving at least two TCI state related parameters or signaling in the parameter or signaling indicating that DCI signaling contains a TCI field, the parameter or signaling indicating that DCI signaling does not contain a TCI field, the DCI signaling containing a TCI field and the DCI signaling not containing a TCI field,
and the determining a transmission parameter of at least one transmission occasion of a transport block according to the at least two TCI state related parameters or signaling includes:
determining by the terminal equipment that TCI states of one or more transmission occasions are all a first TCI state, the first TCI state being a first TCI state indicated in the DCI signaling, or determine that TCI states used for one or more transmission occasions are all a TCI state predefined when the DCI signaling does not contain a TCI indication field; or
determining by the terminal equipment that a TCI state pattern of one or more transmission occasions is one of patterns as follows: a first TCI state (TCI1), a second TCI state (TCI2), a first TCI state (TCI1), a second TCI state (TCI2), or a first TCI state (TCI1), a first TCI state (TCI1), a second TCI state (TCI2), a second TCI state (TCI2).

12. The method according to any one of supplements 1-4, wherein,
the receiving at least two TCI state related parameters or signaling configured or indicated by a network device includes:
receiving the parameter or signaling indicating that DCI signaling contains a TCI field, or receiving the DCI signaling containing a TCI field,
and the determining a transmission parameter of at least one transmission occasion of a transport block according to the at least two TCI state related parameters or signaling includes:
not expecting by the terminal equipment that the TCI field in the DCI signaling indicates more than one TCI states; or
not expecting by the terminal equipment that the TCI field in the DCI signaling indicates only one TCI state.

13. The method according to any one of supplements 1-4, wherein,
the receiving at least two TCI state related parameters or signaling configured or indicated by a network device includes:
receiving the related parameter or signaling containing a TCI state mapping pattern and the DCI signaling containing a TCI field, and the related parameter or signaling containing a TCI state mapping pattern indicates more than one TCI states, and the TCI field in the DCI signaling indicates one TCI state,
and the determining a transmission parameter of at least one transmission occasion of a transport block according to the at least two TCI state related parameters or signaling includes:
determining by the terminal equipment that the TCI state indicated by the TCI field in the DCI signaling is used for at least one transmission occasion.

14. A method for determining transmission parameters, applicable to a terminal equipment side, the method including:
receiving a URLLC scheme 4 related configuration parameter, and not receiving a related parameter or signaling containing a TCI state mapping pattern, by a terminal equipment; and
determining by the terminal equipment that TCI states of one or more transmission occasions are all a first TCI state, the first TCI state being a first TCI state indicated in the DCI signaling, or determining that TCI states used for one or more transmission occasions are all a TCI state predefined when the DCI signaling does not contain a TCI indication field; or determining by the terminal equipment that a TCI state pattern of one or more transmission occasions is one of patterns as follows: a first TCI state (TCI1), a second TCI state (TCI2), a first TCI state (TCI1), a second TCI state (TCI2), or a first TCI state (TCI1), a first TCI state (TCI1), a second TCI state (TCI2), a second TCI state (TCI2).

15. The method according to any one of supplements 1-4 and 14, wherein, the receiving at least two TCI state related parameters or signaling configured or indicated by a network device includes:

receiving the parameter or signaling indicating that DCI signaling contains a TCI field, or receiving the DCI signaling containing a TCI field, and the determining a transmission parameter of at least one transmission occasion of a transport block according to the TCI state pattern determined by the terminal equipment and a parameter or signaling indicating that DCI signaling contains a TCI field in the at least two TCI state related parameters or signaling includes: not expecting by the terminal equipment that the TCI field in the DCI signaling indicates more than one TCI states; or not expecting by the terminal equipment that the TCI field in the DCI signaling indicates only one TCI state; or determining by the terminal equipment that the TCI state indicated by the TCI field in the DCI signaling is used for at least one transmission occasion.

16. A method for determining transmission parameters, applicable to a terminal equipment side, the method including:

receiving DCI signaling containing a TCI field, and not receiving a related parameter or signaling containing a TCI state mapping pattern, by a terminal equipment; and not expecting by the terminal equipment that the TCI field in the DCI signaling indicates more than one TCI states or expecting by the terminal equipment that the TCI field in the DCI signaling indicates one TCI state; or not expecting by the terminal equipment that the TCI field in the DCI signaling indicates only one TCI state; or determining by the terminal equipment that the TCI state indicated by the TCI field in the DCI signaling is used for at least one transmission occasion.

17. A method for determining transmission parameters, applicable to a terminal equipment side, the method including:

receiving a URLLC scheme 3 related configuration parameter by a terminal equipment, and receiving a parameter or signaling indicating that DCI signaling does not contain a TCI field or receiving DCI signaling not containing a TCI field; and determining by the terminal equipment a predefined TCI state when a scheduled PDSCH has only one transmission occasion and a TCI state used for the transmission occasion is that DCI signaling does not contain a TCI indication field, or determining by the terminal equipment a predefined TCI state when the scheduled PDSCH has two transmission occasions and TCI states used for the two transmission occasions are both that the DCI signaling does not contain a TCI indication field, or determining by the terminal equipment two predefined TCI states when the scheduled PDSCH has two transmission occasions and TCI states used for the two transmission occasions are both that the DCI signaling does not contain a TCI indication field.

18. The method according to supplement 17, wherein the two predefined TCI states are:

two TCI states of a CORESET used in PDCCH transmission for scheduling a PDSCH; or, an activated TCI state of a CORESET used in PDCCH transmission of a PDSCH, and a TCI state of CORESETs to be monitored other than the CORESET used in PDCCH transmission for scheduling a PDSCH; or, TCI states of two CORESETs to be monitored having lowest numbers in two CORESET groups; or, a TCI state pair with a lowest number in TCI states activated by the PDSCH.

19. The method according to supplement 18, wherein the two TCI states of the CORESET used in PDCCH transmission for scheduling a PDSCH are:

two active TCI states of the CORESET, or an active TCI state and a configured and inactivated TCI state of the CORESET.

20. The method according to supplement 18, wherein the TCI state of CORESETs to be monitored other than the CORESET used in PDCCH transmission for scheduling a PDSCH is:

an activated TCI state of a CORESET with a lowest CORESET ID in the CORESETs to be monitored, or, an activated TCI state of a CORESET having a lowest CORESET ID in CORESETs to be monitored and having a higher-layer parameter different from that of the CORESET used in PDCCH transmission for scheduling a PDSCH.

21. The method according to any one of supplements 1-20, wherein the DCI signaling not containing a TCI field is at least one of the following:

DCI format 1_0, DCI format 1_1 or DCI format 1_2.

22. The method according to any one of supplements 1-20, wherein the DCI signaling containing the TCI field is at least one of the following:

DCI format 1_1 or DCI format 1_2.

Supplement II

1. An apparatus for determining transmission parameters, applicable to a terminal equipment side, the apparatus including:

a first receiving unit configured to receive at least two TCI state related parameters or signaling configured or indicated by a network device; and a first determining unit configured to determine a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or determine a transmission parameter of at least one transmission occasion of a transport block according to a related parameter or signaling containing a TCI state mapping pattern, and DCI signaling not containing a TCI field, in the at least two TCI state related parameters or signaling, or determine a transmission parameter of at least one transmission occasion of a transport block according to a TCI state pattern determined by the terminal equipment and a parameter or signaling indicating that DCI signaling contains a TCI field in the at least two TCI state related parameters or signaling.

2. The apparatus according to supplement 1, wherein the TCI state related parameter or signaling includes at least two of the following parameters or signaling:
- a parameter or signaling indicating that DCI signaling contains a TCI field;
- a parameter or signaling indicating that DCI signaling does not contain a TCI field;
- a related parameter or signaling containing a TCI state mapping pattern;
- DCI signaling containing a TCI field; or
- DCI signaling not containing a TCI field.

3. The apparatus according to supplement 1 or 2, wherein, the transmission parameter includes at least one of a TCI state or the number of transmission occasions.

4. The apparatus according to any one of supplements 1-3, wherein,
the first receiving unit receives a related parameter or signaling containing a TCI state mapping pattern, the related parameter or signaling containing a TCI state mapping pattern configuring a TCI state mapping pattern containing at most two TCI states, and receives a parameter or signaling indicating that DCI signaling does not contain a TCI field or receives DCI signaling not containing a TCI field,
and the first determining unit determines that a TCI state of at least one transmission occasion is a predefined TCI state, or determines that a TCI state of at least one transmission occasion is one of two predefined TCI states, or determines that configuration of the network device is an error condition.

5. The apparatus according to supplement 4, wherein the predefined TCI state is a TCI state predefined in a case where the terminal equipment receives the parameter or signaling indicating that DCI signaling does not contain a TCI field, or receives the DCI signaling not containing a TCI field.

6. The apparatus according to supplement 4, wherein the two predefined TCI states are:
- two TCI states of a CORESET used in PDCCH transmission for scheduling a PDSCH, or
- that one TCI state is an activated TCI state of a CORESET used in PDCCH transmission for scheduling a PDSCH, and the other TCI state is a TCI state of a CORESET to be monitored other than the CORESET used in PDCCH transmission for scheduling a PDSCH, or
- TCI states of two CORESETs to be monitored having lowest numbers in two CORESET groups, or
- a TCI state pair having a lowest number in TCI states activated by a PDSCH.

7. The apparatus according to supplement 6, wherein the two TCI states of a CORESET used in PDCCH transmission for scheduling a PDSCH are:
- two activated TCI states of the CORESET, or
- an activated TCI state and a configured and inactivated TCI state of the CORESET.

8. The apparatus according to supplement 6, wherein the TCI state of a CORESET to be monitored other than the CORESET used in PDCCH transmission for scheduling a PDSCH is:
- an activated TCI state of a CORESET having a lowest CORESET ID in the CORESETs to be monitored, or
- an activated TCI state of a CORESET having a lowest CORESET ID in the CORESETs to be monitored and having an HARQ-ACK feedback codebook related higher-layer parameter different from that of the CORESET used in PDCCH transmission for scheduling a PDSCH.

9. The apparatus according to supplement 4, wherein the error condition includes:
that the terminal equipment does not expect that DCI signaling does not contain a TCI indication field in at least one of the following cases where:
- the number of TCI states configured in the related parameter or signaling containing a TCI state mapping pattern is greater than 1;
- a TCI state pattern configured in the related parameter or signaling containing a TCI state mapping pattern is one of patterns as follows: a first TCI state (TCI1), a second TCI state (TCI2), a first TCI state (TCI1), a second TCI state (TCI2), or a first TCI state (TCI1), a first TCI state (TCI1), a second TCI state (TCI2), a second TCI state (TCI2); or
- RRC configures the terminal equipment to perform a multi-TRP transmission scheme, or to perform at least one of URLLC transmission schemes 1a, 2a, 2b, 3 and 4, or an HARQ-ACK codebook related parameter is configured in a CORESET.

10. The apparatus according to any one of supplements 1-3, wherein,
the first receiving unit receives at least two TCI state related parameters or signaling in the parameter or signaling indicating that DCI signaling contains a TCI field, the parameter or signaling indicating that DCI signaling does not contain a TCI field, the DCI signaling containing a TCI field and the DCI signaling not containing a TCI field,
and the apparatus further includes:
- a second determining unit configured to determine that TCI states of one or more transmission occasions are all a first TCI state, the first TCI state being a first TCI state indicated in the DCI signaling, or determine that TCI states used for one or more transmission occasions are all a TCI state predefined when the DCI signaling does not contain a TCI indication field; or
- a third determining unit configured to determine that a TCI state pattern of one or more transmission occasions is one of patterns as follows: a first TCI state (TCI1), a second TCI state (TCI2), a first TCI state (TCI1), a second TCI state (TCI2), or a first TCI state (TCI1), a first TCI state (TCI1), a second TCI state (TCI2), a second TCI state (TCI2).

11. The apparatus according to any one of supplements 1-3 and 10, wherein,
the first receiving unit receives the parameter or signaling indicating that DCI signaling contains a TCI field, or receives the DCI signaling containing a TCI field,
and the first determining unit does not expect that the TCI field in the DCI signaling indicates more than one TCI states, or the first determining unit does not expect that the TCI field in the DCI signaling indicates only one TCI state.

12. The apparatus according to any one of supplements 1-3, wherein,
the first receiving unit receives the related parameter or signaling containing a TCI state mapping pattern and the DCI signaling containing a TCI field, and the related parameter or signaling containing a TCI state mapping pattern indicates more than one TCI states, and the TCI field in the DCI signaling indicates one TCI state,
and the first determining unit determines that the TCI state indicated by the TCI field in the DCI signaling is used for at least one transmission occasion.

13. An apparatus for determining transmission parameters, applicable to a terminal equipment side, the apparatus including:
- a second receiving unit configured to receive at least two TCI state related parameters or signaling in a parameter or signaling indicating that DCI signaling contains a TCI field, a parameter or signaling indicating that the DCI signaling does not contain a TCI field, DCI signaling containing a TCI field and DCI signaling not containing a TCI field; and
- a fourth determining unit configured to determine that TCI states of one or more transmission occasions are all first TCI states, the first TCI states being first TCI states indicated in the DCI signaling, or, configured to determine that TCI states used by one or more transmission occasions are all TCI states predefined when the DCI signaling does not contain a TCI indication field; or,
- a fifth determining unit configured to determine that a TCI state pattern of one or more transmission occasions is one of the patterns as follows: first TCI state (TCI1), second TCI state (TCI2), first TCI state (TCI1), second TCI state (TCI2); or first TCI state (TCI1), first TCI state (TCI1), second TCI state (TCI2), second TCI state (TCI2).

14. An apparatus for determining transmission parameters, applicable to a terminal equipment side, the apparatus including:
- a third receiving unit configured to receive a URLLC scheme 3 related configuration parameter, and receive a parameter or signaling indicating that DCI signaling does not contain a TCI field or DCI signaling not containing a TCI field; and
- a sixth determining unit configured to determine a predefined TCI state when a scheduled PDSCH has only one transmission occasion and a TCI state used for the transmission occasion is that DCI signaling does not contain a TCI indication field, or
- a seventh determining unit configured to determine a predefined TCI state when the scheduled PDSCH has two transmission occasions and TCI states used for the two transmission occasions are both that the DCI signaling does not contain a TCI indication field, or
- an eighth determining unit configured to determine two predefined TCI states when the scheduled PDSCH has two transmission occasions and TCI states used for the two transmission occasions are both that the DCI signaling does not contain a TCI indication field.

15. The apparatus according to supplement 14, wherein the two predefined TCI states are:
- two TCI states of a CORESET used in PDCCH transmission for scheduling a PDSCH, or
- that one TCI state is an activated TCI state of a CORESET used in PDCCH transmission for scheduling a PDSCH, and the other TCI state is a TCI state of a CORESET to be monitored other than the CORESET used in PDCCH transmission for scheduling a PDSCH, or
- TCI states of two CORESETs to be monitored having lowest numbers in two CORESET groups, or
- a TCI state pair having a lowest number in TCI states activated by a PDSCH.

16. The apparatus according to supplement 15, wherein the two TCI states of a CORESET used in PDCCH transmission for scheduling a PDSCH are:
- two activated TCI states of the CORESET, or
- an activated TCI state and a configured and inactivated TCI state of the CORESET.

17. The apparatus according to supplement 15, wherein the TCI state of CORESET to be monitored other than the CORESET used in PDCCH transmission for scheduling a PDSCH is:
- an activated TCI state of a CORESET having a lowest CORESET ID in the CORESETs to be monitored, or
- an activated TCI state of a CORESET having a lowest CORESET ID in the CORESETs to be monitored and having an HARQ-ACK feedback codebook related higher-layer parameter different from that of the CORESET used in PDCCH transmission for scheduling a PDSCH.

18. An apparatus for determining transmission parameters, applicable to a network device side, the apparatus including:
- a first transmitting unit configured to configure or indicate at least two TCI state related parameters or signaling to a terminal equipment,
- so that the terminal equipment determines a transmission parameter of at least one transmission occasion of a transport block according to a related parameter or signaling containing a TCI state mapping pattern, and a parameter or signaling indicating that DCI signaling does not contain a TCI field or a parameter or signaling indicating that DCI signaling contains a TCI field, in the at least two TCI state related parameters or signaling, or
- so that the terminal equipment determines a transmission parameter of at least one transmission occasion of a transport block according to a related parameter or signaling containing a TCI state mapping pattern, and DCI signaling not containing a TCI field, in the at least two TCI state related parameters or signaling, or
- so that the terminal equipment determines a transmission parameter of at least one transmission occasion of a transport block according to a TCI state pattern determined by the terminal equipment and a parameter or signaling indicating that DCI signaling contains a TCI field in the at least two TCI state related parameters or signaling.

19. The apparatus according to supplement 18, wherein the TCI state related parameter or signaling include at least two of the following parameters or signaling:
- a parameter or signaling indicating that DCI signaling contains a TCI field;
- a parameter or signaling indicating that DCI signaling does not contain a TCI field;
- a related parameter or signaling containing a TCI state mapping pattern;
- DCI signaling containing a TCI field; or
- DCI signaling not containing TCI field.

20. The apparatus according to supplement 18 or 19, wherein,
the transmission parameter includes at least one of a TCI state or the number of transmission occasions.

21. The apparatus according to any one of supplements 18-20, wherein,
the TCI state related parameter or signaling configured or indicated by the network device includes related parameter or signaling containing a TCI state mapping pattern and DCI signaling containing a TCI field,
the number of TCI states indicated by the related parameter or signaling containing a TCI state mapping pattern being in consistence with the number of TCI states indicated by the TCI field in the DCI signaling.

22. A terminal equipment, including the apparatus according to any one of supplements 1-17.

23. A network device, including the apparatus according to any one of supplements 18-21.

24. A communication system, including the terminal equipment according to supplement 22 and/or the network device according to supplement 23.

What is claimed is:

1. An apparatus for determining a transmission parameter, applicable to a terminal equipment side, the apparatus comprising:
a receiver configured to receive:
at least two transmission configuration indication (TCI) state related parameters or signaling configured or indicated by a network device, the at least two TCI state related parameters or signaling including a related parameter or signaling containing a TCI state mapping pattern configuring a TCI state mapping pattern containing at most two TCI states, and
DCI signaling not containing a TCI field; and
processor circuitry configured to
determine a transmission parameter of at least one transmission occasion of a transport block according to the related parameter or signaling containing the TCI state mapping pattern, and the DCI signaling not containing a TCI field; and
determine that a TCI state of at least one transmission occasion is a predefined TCI state, determine that a TCI state of at least one transmission occasion is one of two defined TCI states, or determine that configuration of the network device is an error condition,
wherein the predefined TCI state is a TCI state predefined in a case where the terminal equipment receives the DCI signaling not containing a TCI field.

2. The apparatus according to claim 1, wherein the TCI state related parameters or signaling comprise(s) at least two of the following parameters or signaling:
a parameter or signaling indicating that DCI signaling contains a TCI field;
a parameter or signaling indicating that DCI signaling does not contain a TCI field;
a related parameter or signaling containing a TCI state mapping pattern;
DCI signaling containing a TCI field; or
DCI signaling not containing a TCI field.

3. The apparatus according to claim 1, wherein, the transmission parameter comprises at least one of a TCI state or the number of transmission occasions.

4. The apparatus according to claim 1, wherein the two predefined TCI states are:
two TCI states of a control resource set (CORESET) used in physical downlink control channel (PDCCH) transmission for scheduling a physical downlink shared channel (PDSCH), or
that one TCI state is an activated TCI state of a CORESET used in PDCCH transmission for scheduling a PDSCH, and the other TCI state is a TCI state of a CORESET to be monitored other than a CORESET used in PDCCH transmission for scheduling a PDSCH, or
TCI states of two CORESETs to be monitored having lowest numbers in two CORESET groups, or
a TCI state pair having a lowest number in TCI states activated by a PDSCH.

5. The apparatus according to claim 4, wherein the two TCI states of a CORESET used in PDCCH transmission for scheduling a PDSCH are:
two activated TCI states of the CORESET, or
an activated TCI state and a configured and inactivated TCI state of the CORESET.

6. The apparatus according to claim 4, wherein the TCI state of a CORESET to be monitored other than a CORESET used in PDCCH transmission for scheduling a PDSCH is:
an activated TCI state of a CORESET having a lowest CORESET ID in the CORESETs to be monitored, or
an activated TCI state of a CORESET having a lowest CORESET ID in the CORESETs to be monitored and having an HARQ-ACK feedback codebook related higher-layer parameter different from that of the CORESET used in PDCCH transmission for scheduling a PDSCH.

7. The apparatus according to claim 1, wherein the error condition comprises:
that the terminal equipment does not expect that DCI signaling does not contain a TCI indication field in at least one of the following cases where:
the number of TCI states configured in the related parameter or signaling containing a TCI state mapping pattern is greater than 1;
a TCI state pattern configured in the related parameter or signaling containing a TCI state mapping pattern is one of patterns as follows: a first TCI state (TCI1), a second TCI state (TCI2), a first TCI state (TCI1), a second TCI state (TCI2), or a first TCI state (TCI1), a first TCI state (TCI1), a second TCI state (TCI2), a second TCI state (TC12); or
RRC configures the terminal equipment to perform a multi-TRP transmission scheme, or to perform at least one of ultra-reliable and low-latency communication (URLLC) transmission schemes 1a, 2a, 2b, 3 and 4, or an HARQ-ACK codebook related parameter is configured in a CORESET.

8. An apparatus for determining a transmission parameter, applicable to a network device side, the apparatus comprising:
a transmitter configured:
to transmit at least two TCI state related parameters or signaling to a terminal equipment, and to configure or indicate the at least two TCI state related parameters or signaling to the terminal equipment, the at least two TCI state related parameters or signaling including a related parameter or signaling containing a TCI state mapping pattern configuring a TCI state mapping pattern containing at most two TCI states, and
to transmit DCI signaling not containing a TCI field to the terminal equipment,
so that the terminal equipment determines a transmission parameter of at least one transmission occasion of a transport block according to the related parameter or signaling containing a TCI state mapping pattern, and the DCI signaling not containing a TCI field, and
so that the terminal equipment determines that a TCI state of at least one transmission occasion is a predefined TCI state, or determines that a TCI state of at least one transmission occasion is one of two predefined TCI states, or determines that configuration of the network drive is an error condition,
wherein the predefined TCI state is a TCI state predefined in a case where the terminal equipment receives the DCI signaling not containing a TCI field.

9. The apparatus according to claim 8, wherein the TCI state related parameter or signaling comprise at least two of the following parameters or signaling:
a parameter or signaling indicating that DCI signaling contains a TCI field;

a parameter or signaling indicating that DCI signaling does not contain a TCI field;

a related parameter or signaling containing a TCI state mapping pattern;

DCI signaling containing a TCI field; or

DCI signaling not containing a TCI field.

10. The apparatus according to claim 8, wherein, the transmission parameter comprises at least one of a TCI state or the number of transmission occasions.

11. The apparatus according to claim 8, wherein,
the TCI state related parameter or signaling configured or indicated by the network device comprises a related parameter or signaling containing a TCI state mapping pattern and DCI signaling containing a TCI field, and the number of TCI states indicated by the related parameter or signaling containing a TCI state mapping pattern is in consistence with the number of TCI states indicated by the TCI field in the DCI signaling.

* * * * *

UNITED STATES PATENT AND TRADEMARK OFFICE
CERTIFICATE OF CORRECTION

PATENT NO. : 12,301,504 B2  
APPLICATION NO. : 17/731346  
DATED : May 13, 2025  
INVENTOR(S) : Lei Song, Zhe Chen and Lei Zhang Page 1 of 1

It is certified that error appears in the above-identified patent and that said Letters Patent is hereby corrected as shown below:

In the Claims

Column 39, Claim 1, Line 28 should read "of two predefined TCI states, or determine that configu-"

Signed and Sealed this  
Second Day of December, 2025

John A. Squires  
*Director of the United States Patent and Trademark Office*